United States Patent
Isono

(10) Patent No.: US 11,428,304 B2
(45) Date of Patent: Aug. 30, 2022

(54) TORQUE VECTORING DEVICE

(71) Applicant: Toyota Jidosha Kabushiki Kaisha, Toyota (JP)

(72) Inventor: Hiroshi Isono, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/206,817

(22) Filed: Mar. 19, 2021

(65) Prior Publication Data

US 2021/0301912 A1    Sep. 30, 2021

(30) Foreign Application Priority Data

Mar. 24, 2020 (JP) .............................. JP2020-053155

(51) Int. Cl.
*F16H 48/36* (2012.01)
*F16H 48/10* (2012.01)
*B60K 1/00* (2006.01)

(52) U.S. Cl.
CPC ........ *F16H 48/36* (2013.01); *B60K 2001/001* (2013.01); *F16H 2048/104* (2013.01); *F16H 2048/106* (2013.01); *F16H 2048/364* (2013.01); *F16H 2048/368* (2013.01)

(58) Field of Classification Search
CPC .... F16H 48/10–11; F16H 48/34; F16H 48/36; F16H 2048/343; F16H 2048/364; F16H 2048/368; B60K 2001/001
See application file for complete search history.

(56) References Cited

U.S. PATENT DOCUMENTS

| | | | |
|---|---|---|---|
| 8,430,779 B2* | 4/2013 | Hoehn | F16H 48/11 475/225 |
| 10,030,755 B2* | 7/2018 | Severinsson | B60K 6/48 |
| 10,641,375 B2* | 5/2020 | Kurth | B60K 23/04 |
| 10,648,549 B2* | 5/2020 | Kurth | F16H 48/30 |
| 11,181,177 B2* | 11/2021 | Isono | F16H 48/24 |
| 2016/0153537 A1 | 6/2016 | Kubo et al. | |
| 2020/0182342 A1* | 6/2020 | Ahn | F16H 3/725 |

FOREIGN PATENT DOCUMENTS

JP 6122119 B2 4/2017
WO WO-2007093568 A1 * 8/2007 .............. F16H 48/11

* cited by examiner

*Primary Examiner* — Ernesto A Suarez
*Assistant Examiner* — James J Taylor, II
(74) *Attorney, Agent, or Firm* — Dinsmore & Shohl LLP

(57) ABSTRACT

A downsized torque vectoring device in which a passive rotation of an actuator is prevented. A torque vectoring device comprises: a differential mechanism that allows a differential rotation between a first rotary shaft and second rotary shaft; an actuator that applies torque to the differential mechanism to rotate the rotary shafts at different speeds; and a reversing mechanism that allows the rotary shafts to rotate in opposite directions. The reversing mechanism comprises a first control gear set and the second rotary shaft arranged coaxially around the rotary shafts, and gear ratios of the first control gear set and the second control gear set are set to different values. A speed increasing gear set and a speed reducing gear set are arranged between a prime mover and an output shaft of the actuator, and ring gears of the speed increasing gear set and the speed reducing gear set are connected to each other.

8 Claims, 7 Drawing Sheets

TORQUE VECTORING DEVICE

CROSS REFERENCE TO RELATED APPLICATION

The present disclosure claims the benefit of Japanese Patent Application No. 2020-053155 filed on Mar. 24, 2020, with the Japanese Patent Office, the disclosures of which are incorporated herein by reference in its entirety.

BACKGROUND

Technical Field

Embodiments of the present disclosure relate to the art of a torque vectoring device for controlling a distribution ratio of a torque delivered to rotary shafts extending coaxially.

Discussion of the Related Art

JP-B2-6122119 describes one example of a drive gear unit as a torque vectoring device mounted on a vehicle. The drive gear unit taught by JP-B2-6122119 comprises a differential gear unit that distributes rotational torque into right and left wheels, and a control (or differential) motor that controls a distribution ratio of torque distributed through the differential gear unit to the right and left wheels. As illustrated in FIG. 1 of JP-B2-6122119, the drive gear unit comprises two sets of planetary gear units. In the drive gear unit, sun gears of the planetary gear units are connected to each other through a connection shaft to serve as an input element, each carrier of the planetary gear units individually serves as an output element, and each ring gear of the planetary gear units individually serves as a reaction element. An intermediate gear is fitted onto an intermediate portion of the connection shaft, and an input gear to which torque is delivered from a prime mover is mated with the intermediate gear. Each of the carriers is individually connected to the drive wheels through a driveshaft. The ring gears are connected to each other through a reverse rotation member including a first gear and a second gear, and the control motor is connected to one of the ring gears. Specifically, the first gear includes a first pinion engaged with outer teeth of one of the ring gears, a shaft member, and a second pinion, and the first pinion and the second pinion are mounted on each end of the shaft member. Likewise, the second gear includes a first pinion engaged with outer teeth of other one of the ring gears, a shaft member, and a second pinion, and the first pinion and the second pinion are mounted on each end of the shaft member. The second pinion of the first gear is engaged with the second pinion of the second gear. Thus, the reverse rotation member transmits torque delivered to one of the ring gears from the control motor to the other one of ring gears while reversing.

In order to fit the drive gear unit taught by JP-B2-6122119 into an automobile, the drive gear unit is downsized as much as possible. However, in the drive gear unit shown in FIG. 1 of JP-B2-6122119, the reverse rotation member and the control motor are situated radially outer side of the ring gears thereby increasing the size of the drive gear unit. In the drive gear unit of this kind, for example, a torque of the control motor may be increased to downsize the control motor by arranging a speed reducing mechanism of large speed reducing ratio between the control motor and the ring gear. In this case, however, the size of the drive gear unit may be increased by the speed reducing mechanism.

On the other hand, in the drive gear unit shown in FIG. 19 of JP-B2-6122119, the reversing motor is disposed between the sun gears, and hence the drive gear unit may be downsized in a radial direction but it is not easy. That is, the reversing motor has a complicated dual-axis structure in which the counter shaft extends parallel to the first output shaft and the second output shaft. Therefore, if the additional speed reducing mechanism is arranged in the drive gear unit to downsize the reversing motor, the structure of the reversing motor becomes more complicated and this makes the reversing motor difficult to be fitted within an outer diameter of each of the planetary gear units.

As described, according to the teachings of JP-B2-6122119, the drive gear unit is provided with the control motor serving as an actuator to change an operating condition of the differential gear unit. Specifically, the distribution ratio of the torque distributed to the right and left wheels may be changed effectively by changing the output torque of the control motor. Thus, the drive gear unit taught by JP-B2-6122119 is adapted to perform torque vectoring.

However, when the right driveshaft and the left driveshaft are rotated at a same speed to propel the vehicle having the drive gear unit taught by JP-B2-6122119 in a straight line, the differential gear unit is rotated integrally. In this situation, therefore, the control motor is rotated passively by the torque delivered thereto from the input gear or the driveshaft through the differential gear unit. Consequently, a power transmission efficiency of the drive gear unit and an energy efficiency of the vehicle will be reduced. In addition, an acceleration performance and a deceleration performance of the vehicle may be reduced by an inertia torque of the control motor being rotated passively. Such reduction in the acceleration performance and the deceleration performance may be prevented by generating a cancel torque counteracting the inertia torque by the control motor. However, an additional control is required to generate the cancel torque by the control motor.

SUMMARY

Aspects of embodiments of the present disclosure have been conceived noting the foregoing technical problems, and it is therefore an object of embodiments of the present disclosure to downsize a torque vectoring device, and to prevent a passive rotation of an actuator in the torque vectoring device.

An exemplary embodiment of the present disclosure relates to a torque vectoring device, comprising: an input member to which a torque is delivered from a prime mover; a first rotary shaft and a second rotary shaft extending coaxially while being allowed to rotate relatively to each other; a differential mechanism that distributes the torque delivered to the input member to the first rotary shaft and the second rotary shaft, and that allows the first rotary shaft and the second rotary shaft to rotate at different speeds; an actuator that applies a control torque to the differential mechanism to rotate the first rotary shaft and the second rotary shaft at different speeds; and a reversing mechanism that allows the first rotary shaft and the second rotary shaft to rotate in opposite directions when the first rotary shaft and the second rotary shaft rotate at different speeds. In the torque vectoring device, the differential mechanism comprises a first power transmission gear set and a second power transmission gear set arranged coaxially with the first rotary shaft and the second rotary shaft. The first power transmission gear set comprises: a power input element to which the torque is delivered from the input member; a first power output element which delivers the torque to the first rotary shaft; and a first differential reaction element to which the control torque is applied as a reaction force against the torque delivered from the power input element to the first power output element. The second power transmission gear set comprises: the power input element; a second power output element which delivers the torque to the second rotary shaft; and a second differential reaction element to which the control torque is applied as a reaction force against the torque delivered from the power input element to the second power output element. The reversing mechanism comprises: a first control gear set that is arranged coaxially around the first rotary shaft and the second rotary shaft to transmit the control torque to the first rotary shaft through the first differential reaction element; and a second control gear set that is arranged coaxially around the first rotary shaft and the second rotary shaft to transmit the control torque to the second rotary shaft through the second differential reaction element. The first control gear set comprises: a control input element to which the control torque of the actuator is applied; a first control output element which delivers the control torque to the first rotary shaft; a first planetary gear to which the control torque is delivered from the control input element; and a first gear that engages with the first planetary gear to serve as the first control output element. The second control gear set comprises: the control input element; a second control output element which delivers the control torque to the second rotary shaft; a second planetary gear which is arranged coaxially with the first planetary gear, and to which the control torque is delivered from the control input element; and a second gear that engages with the second planetary gear to serve as the second control output element. A first gear train includes the first planetary gear and the first gear, and a second gear train includes the second planetary gear and the second gear. A gear ratio of the first gear train and a gear ratio of the second gear train are different from each other. A first speed reducing ratio of the reversing mechanism as a ratio of a speed of the first control output element to a speed of the control input element is greater than 1, and a second speed reducing ratio of the reversing mechanism as a ratio of a speed of the second control output element to the speed of the control input element is also greater than 1. The reversing mechanism serves as a reduction gear mechanism to transmit the control torque to the first control output element and the second control output element while multiplying the control torque. The torque vectoring device further comprising: a speed increasing gear set comprising a speed increasing sun gear, a speed increasing carrier, and a speed increasing ring gear, that is arranged coaxially with the first rotary shaft and the second rotary shaft; and a speed reducing gear set comprising a reduction sun gear, a reduction carrier, and a reduction ring gear, that is arranged coaxially with the first rotary shaft and the second rotary shaft. The speed increasing sun gear is fixed and not allowed to rotate, the speed increasing carrier is connected to the input member to be rotated integrally with the input member, and the speed increasing ring gear is rotated at a higher speed than a speed of the speed increasing carrier. The reduction sun gear is connected to an output shaft of the actuator transmitting the control torque to the reversing mechanism to be rotated integrally with the output shaft. The reduction carrier is rotated at a lower speed than a speed of the reduction ring gear when the input member, the first rotary shaft, and the second rotary shaft are rotated integrally. The reduction ring gear is connected to the speed increasing ring gear to be rotated integrally with the speed increasing ring gear.

In a non-limiting embodiment, the reduction sun gear may be rotated relatively to the reversing mechanism, when the first rotary shaft and the second rotary shaft rotate in a same direction at a same speed so that the reversing mechanism is rotated passively together with the power input element, the first power output element, and the second power output element.

In a non-limiting embodiment, a gear ratio of the speed increasing gear set and a gear ratio of the speed reducing gear set may be equal to each other.

In a non-limiting embodiment, the torque vectoring device may further comprise: a third planetary gear arranged coaxially with the first planetary gear and the second planetary gear; and a carrier that supports the first planetary gear, the second planetary gear, and the third planetary gear in a rotatable and revolvable manner. In the torque vectoring device, the first planetary gear, the second planetary gear, and the third planetary gear may rotate integrally, and the torque is delivered from the power input element to the third planetary gear. The differential mechanism may comprise: the first planetary gear, the second planetary gear, and the third planetary gear; a first sun gear, a second sun gear, and a third sun gear arranged coaxially with one another while engaging with the first planetary gear, the second planetary gear, and the third planetary gear, respectively; and the carrier. In the differential mechanism, the first sun gear, the second sun gear, and the third sun gear may be allowed to rotate relatively to one another. The first power transmission gear set may comprise: the third sun gear serving as the power input element; the first sun gear serving as the first power output element; and the carrier serving as the first differential reaction element. The second power transmission gear set may comprise: the third sun gear serving as the power input element; the second sun gear serving as the second power output element; and the carrier serving as the second differential reaction element. The reversing mechanism may comprise: the first planetary gear, the second planetary gear, and the third planetary gear; the first sun gear, the second sun gear, and the third sun gear; and the carrier. The first control gear set may comprise: the carrier serving as the control input element; and the first sun gear serving as the first gear to serve as the first control output element. The second control gear set may comprise: the carrier serving as the control input element; and the second sun gear serving as the second gear to serve as the second control output element. The number of teeth of the first sun gear, the number of teeth of the second sun gear, and the number of teeth of the third sun gear may be equal to one another. The number of teeth of the first planetary gear may be larger than the number of teeth of the third planetary gear, and the number of teeth of the second planetary gear may be smaller than the number of teeth of the third planetary gear.

In a non-limiting embodiment, the torque vectoring device may further comprise: a third planetary gear arranged coaxially with the first planetary gear and the second planetary gear; and a carrier that supports the first planetary gear, the second planetary gear, and the third planetary gear in a rotatable and revolvable manner. In the torque vectoring device, the first planetary gear, the second planetary gear, and the third planetary gear may rotate integrally, and the torque may be delivered from the power input element to the third planetary gear. The differential mechanism may comprise: the first planetary gear, the second planetary gear, and the third planetary gear; a first ring gear as an internal gear, a second ring gear as an internal gear, and a third ring gear as an internal gear arranged coaxially with one another while engaging with the first planetary gear, the second planetary gear, and the third planetary gear, respectively; and the carrier. In the differential mechanism, the first ring gear, the second ring gear, and the third ring gear may be allowed to rotate relatively to one another. The first power transmission gear set may comprise: the third ring gear serving as the power input element; the first ring gear serving as the first power output element; and the carrier serving as the first differential reaction element. The second power transmission gear set may comprise: the third ring gear serving as the power input element; the second ring gear serving as the second power output element; and the carrier serving as the second differential reaction element. The reversing mechanism may comprise: the first planetary gear, the second planetary gear, and the third planetary gear; the first ring gear, the second ring gear, and the third ring gear; and the carrier. The first control gear set may comprise: the carrier serving as the control input element; and the first ring gear serving as the first gear to serve as the first control output element. The second control gear set may comprise: the carrier serving as the control input element; and the second ring gear serving as the second gear to serve as the second control output element. The number of teeth of the first ring gear, the number of teeth of the second ring gear, and the number of teeth of the third ring gear may be equal to one another. The number of teeth of the first planetary gear may be larger than the number of teeth of the third planetary gear, and the number of teeth of the second planetary gear may be smaller than the number of teeth of the third planetary gear.

In a non-limiting embodiment, the carrier may comprise: a planetary gear shaft that supports the first planetary gear, the second planetary gear, and the third planetary gear in a rotatable manner; a first plate that supports one end of the planetary gear shaft; and a second plate that supports the other end of the planetary gear shaft. In addition, the speed increasing gear set and the speed reducing gear set may be arranged parallel to each other across the first plate or the second plate along a rotational center axis.

In a non-limiting embodiment, the first rotary shaft and the second rotary shaft may extend coaxially in a width direction of a vehicle.

In a non-limiting embodiment, the first rotary shaft and the second rotary shaft may extend coaxially in a longitudinal direction of a vehicle.

In a non-limiting embodiment, the actuator may include an electric motor that generates the control torque to rotate the control input element, and a brake device that generates a brake torque to brake the control input element.

In the torque vectoring device according to the exemplary embodiment of the present disclosure, the torque generated by the prime mover is distributed to the first rotary shaft and the second rotary shaft through the differential mechanism while absorbing a speed difference between the first rotary shaft and the second rotary shaft by the differential mechanism. That is, the differential mechanism allows the first rotary shaft and the second rotary shaft to rotate at different speeds. When the first rotary shaft and the second rotary shaft rotate at different speeds, the first rotary shaft and the second rotary shaft are allowed to rotate in opposite directions by the reversing mechanism. According to the exemplary embodiment of the present disclosure, therefore, speed difference between the first rotary shaft and the second rotary shaft can be absorbed efficiently.

As described, the torque vectoring device according to the embodiment of the present disclosure is provided with the actuator that applies the control torque to the differential reaction elements of the differential mechanism. Therefore, in addition to the above-explained advantage, a torque distribution ratio and a differential rotation between the first rotary shaft and the second rotary shaft may be controlled effectively. Specifically, the torque vectoring device according to the embodiment of the present disclosure may be applied to a four-wheel drive layout vehicle to control a differential rotation between a right wheel and a left wheel or between a front wheel and a rear wheel.

Moreover, according to the exemplary embodiment of the present disclosure, the reversing mechanism is arranged coaxially around the first rotary shaft and the second rotary shaft. That is, the reversing mechanism as a main constituent of the torque vectoring device has a simple uniaxial structure. According to the exemplary embodiment of the present disclosure, therefore, the reversing mechanism may be arranged easily in the torque vectoring device without increasing a size of the torque vectoring device in the radial direction. Specifically, the first rotary shaft and the second rotary shaft are allowed to rotate in opposite directions by differentiating the gear ratio of the first gear train of the first control gear set and the gear ratio of the second gear train of the second control gear set from each other. For example, the gear ratio of the first gear train and the gear ratio of the second gear train may be differentiated from each other by increasing or reducing the number of teeth of the first gear with respect to a reference number, and increasing or reducing the number of teeth of the second gear with respect to a reference number. According to the exemplary embodiment of the present disclosure, therefore, the first rotary shaft and the second rotary shaft are allowed to rotate in opposite directions without employing a complex mechanism.

Thus, according to the exemplary embodiment of the present disclosure, the gear ratio of the first gear train of the first control gear set and the gear ratio of the second gear train of the second control gear set are differentiated from each other. Therefore, when the first rotary shaft and the second rotary shaft are rotated at a same speed, torques are applied to an engagement site of the first gear train and to an engagement site of the second gear train in opposite directions thereby causing interference between the first gear train and the second gear train. Consequently, the reversing mechanism is substantially brought into engagement to rotate integrally so that the first rotary shaft and the second rotary shaft are rotated integrally without rotating relatively to each other. By contrast, when the first rotary shaft and the second rotary shaft are rotated at different speeds, the reversing mechanism will not be brought into engagement due to interference between the first gear train and the second gear train. In this case, the first control gear set transmits the torque in accordance with the gear ratio of the first gear train, and the second control gear set transmits the torque in accordance with the gear ratio of the second gear train. Consequently, a rotational direction of one of the first rotary shaft and the second rotary shaft is reversed to a direction opposite to a rotational direction of the other one of the first rotary shaft and the second rotary shaft. Thus, the torque vectoring device according to the exemplary embodiment of the present disclosure not only distributes the torque of the prime mover to the first rotary shaft and the second rotary haft, but also absorbs the speed difference between the first rotary shaft and the second rotary shaft. In addition, a torque distribution ratio between the first rotary shaft and the second rotary shaft may be changed by changing the control torque generated by the actuator.

Moreover, according to the exemplary embodiment of the present disclosure, a speed reducing ratio of the first control gear set and a speed reducing ratio of the second control gear set are greater than 1, respectively. That is, the reversing mechanism serves as a speed reducing gear set that multiplies the control torque of the actuator. According to the exemplary embodiment of the present disclosure, therefore, the actuator may be downsized thereby reducing the size of the torque vectoring device.

Thus, according to the exemplary embodiment of the present disclosure, the reversing mechanism having a uniaxial structure may be formed easily without employing a complex mechanism. Since the reversing mechanism is arranged coaxially with the first rotary shaft and the second rotary shaft, the size of the torque vectoring device will not be increased in the radial direction. In addition, since the reversing mechanism has a torque multiplying function, the actuator may be downsized. According to the exemplary embodiment of the present disclosure, therefore, the torque vectoring device may be downsized to be fitted easily in a vehicle.

Further, in order not to rotate the actuator passively, the torque vectoring device according to the exemplary embodiment of the present disclosure is provided with the speed increasing gear set and the speed reducing gear set. In the torque vectoring device according to the exemplary embodiment of the present disclosure, the differential mechanism and the reversing mechanism are rotated integrally (i.e., passively) when the first rotary shaft and the second rotary shaft the rotate in the same direction at a same speed. Consequently, the speed increasing carrier of the speed increasing gear set and the reduction carrier of the speed reducing gear set are rotated in the same direction at a same speed. In this situation, the speed increasing gear set in which the speed increasing sun gear is fixed serves as a speed increasing mechanism to increase a rotational speed of the speed increasing ring gear higher than a rotational speed of the speed increasing carrier. On the other hand, the speed reducing gear set serves as a speed reducing mechanism to reduce a rotational speed of the reduction carrier lower than a rotational speed of the reduction ring gear. In this situation, since the speed increasing ring gear is connected to the reduction ring gear, the speed increasing ring gear and the reduction ring gear are also rotated at a same speed. Consequently, an absolute value of the speed increasing ratio of the speed increasing gear set and an absolute value of the speed reducing ratio of the speed reducing gear set are equalized to each other. In this situation, since a rotational speed of the speed increasing sun gear is zero, the rotational speed of the reduction sun gear is reduced to substantially zero that is lower than the rotational speed of the reduction ring gear, in accordance with the gear ratio of the speed reducing gear set. That is, since the gear ratio of the speed increasing gear set and the gear ratio of the speed reducing gear set are equal to each other, the rotational speed of the reduction sun gear is reduced to substantially zero. Therefore, when the first rotary shaft and the second rotary shaft rotate in the same direction at the same speed so that the differential mechanism and the reversing mechanism are rotated integrally and passively, a rotational speed of the output shaft of the actuator connected to the reduction sun gear is maintained to zero. For this reason, the actuator can be prevented from being rotated passively.

In addition, by thus preventing the passive rotation of the actuator, according to the first example, a power transmission efficiency and an energy efficiency of the torque vectoring device can be improved. Further, since the actuator is not rotated passively when the vehicle travelling in a straight line, the torque vectoring device will not be subjected to an inertia torque of the actuator even if the vehicle is accelerated or decelerated abruptly. For this reason, it is not necessary to execute an additional control to generate a cancel torque against an inertia torque of the actuator. That is, a torque vectoring control of the actuator can be simplified.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

DETAILED DESCRIPTION OF THE EMBODIMENT(S)

Embodiments of the present disclosure will now be explained with reference to the accompanying drawings. Note that the embodiments shown below are merely examples of the present disclosure which should not limit a scope of the present disclosure.

First Example

Figure 1:
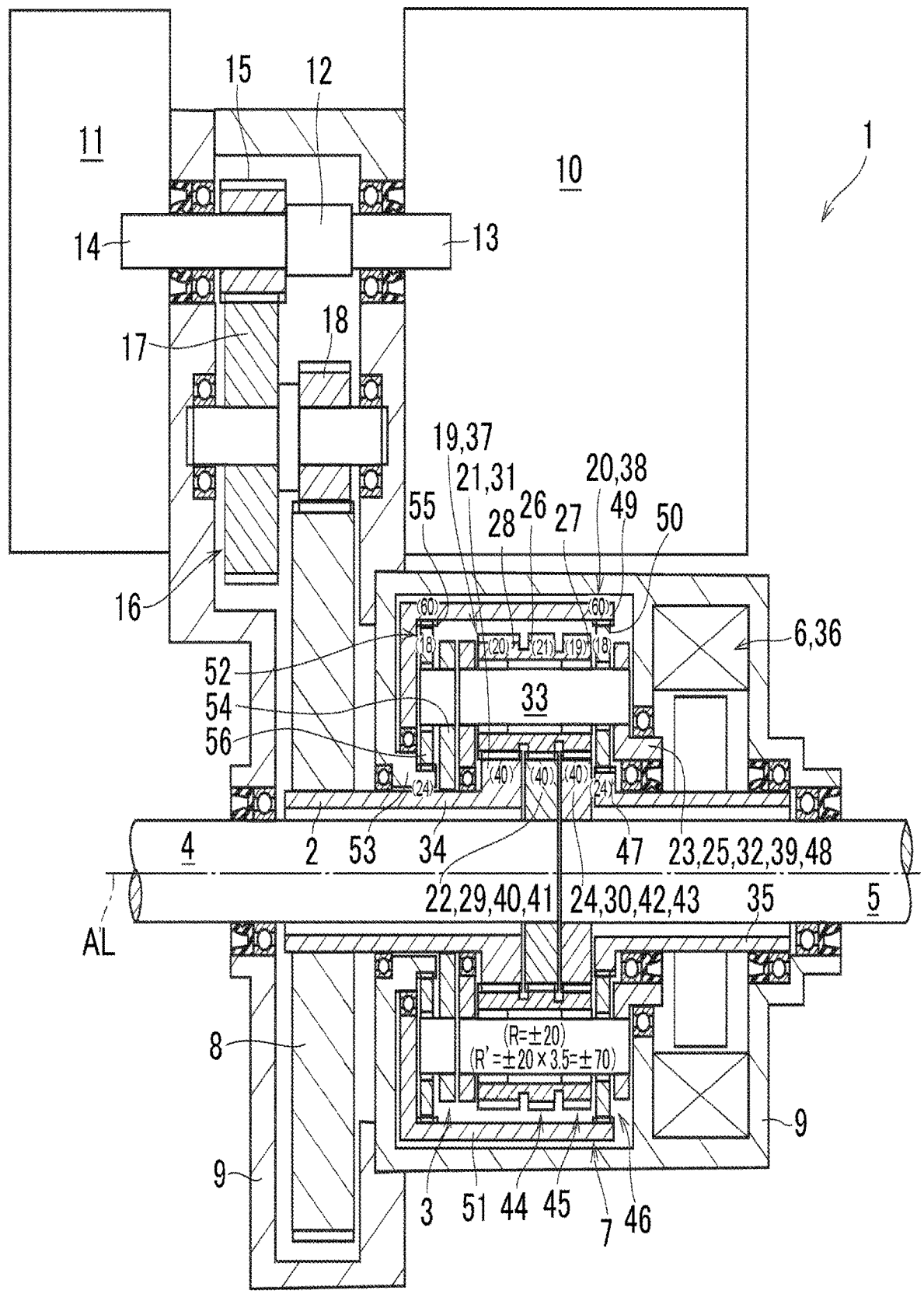
FIG. 1 is a cross-sectional view showing a structure of the torque vectoring device according to the first example of the present disclosure.

Referring now to FIG. 1, there is shown a structure of a torque vectoring device 1 according to the first example of the present disclosure. As shown in FIG. 1, the torque vectoring device 1 comprises an input member 2, a differential mechanism 3, a first rotary shaft 4, a second rotary shaft 5, an actuator 6, and a reversing mechanism 7.

A torque generated by a prime mover is applied to the input member 2 as a hollow rotary shaft. According to the first example, both ends of the input member 2 are supported by a case 9 of the torque vectoring device 1 in a rotatable manner. Specifically, the input member 2 is fitted onto the first rotary shaft 4 while being allowed to rotate relatively with first rotary shaft 4, and an input gear 8 is fitted onto the input member 2 to rotate integrally with the input gear 8. The input gear 8 is connected to a prime mover through a reduction gear train 16.

According to the first example, the prime mover includes a motor 10 and a brake device 11. Specifically, an output shaft 13 of the motor 10 is connected to one end of a power shaft 12, and a rotary shaft 14 of the brake device 11 is connected to the other end of the power shaft 12.

The motor 10 generates a torque including a drive torque and a regenerative torque. For example, a permanent magnet type synchronous motor or an induction motor may be adopted as the motor 10. On the other hand, the brake device 11 generates a brake torque. For example, the brake device 11 may be selected from: an electromagnetic brake that stops a rotation of a rotary member by a magnetic attraction force generated by passage of an electric current; an electric brake that generates a frictional braking force using a feed screw mechanism driven by a motor; and a regenerative brake that stops a rotation of a rotary member utilizing a resistance force generated when generating electricity by a motor.

Thus, the motor 10 and the brake device 11 are integrated with the torque vectoring device 1 according to the first example to form a power unit having a torque vectoring function and a braking function. Here, the torque vectoring device 1 according to the first example may be combined only with the motor 10 to form a motor drive unit having a torque vectoring function, or only with the brake device 11 to form a brake unit having a torque vectoring function.

A pinion 15 is mounted on an intermediate portion of the power shaft 12 to rotate integrally with the input member 2, and the pinion 15 is engaged with a diametrically-larger gear 17 of the reduction gear train 16. Specifically, the reduction gear train 16 comprises the diametrically-larger gear 17 and a diametrically-smaller gear 18 arranged coaxially with the diametrically-larger gear 17, and the diametrically-larger gear 17 and the diametrically-smaller gear 18 are rotated together. A diameter of the diametrically-larger gear 17 is larger than that of the pinion 15, and the number of teeth of the diametrically-larger gear 17 is larger than that of the pinion 15. On the other hand, the diametrically-smaller gear 18 is engaged with the input gear 8. A diameter of the diametrically-smaller gear 18 is smaller than that of the input gear 8, and the number of teeth of the diametrically-larger gear 17 is smaller than that of the pinion 15. That is, a gear train formed of the pinion 15, the diametrically-larger gear 17, the diametrically-smaller gear 18, and the input gear 8 serves as the reduction gear train 16 that reduces an output speed from the input gear 8 lower than an input speed to the pinion 15. In other words, the torque of the prime mover applied to the power shaft 12 is delivered to the input member 2 while being multiplied by the reduction gear train 16.

The differential mechanism 3 comprises a first power transmission gear set 19 as a planetary gear set, and a second power transmission gear set 20 as a planetary gear set arranged coaxially with the first power transmission gear set 19. The first power transmission gear set 19 comprises: a power input element 21 to which the torque is delivered from the input member 2; a first power output element 22 which delivers the torque to the first rotary shaft 4; and a first differential reaction element 23 to which an after-mentioned control torque is applied as a reaction force against the torque delivered to the first power output element 22. On the other hand, the second power transmission gear set 20 comprises: the power input element 21 which is also used in the first power transmission gear set 19; a second power output element 24 which delivers the torque to the second rotary shaft 5; and a second differential reaction element 25 to which the control torque is applied as a reaction force against the torque delivered to the second power output element 24. According to the first example, an after-mentioned carrier 32 serves not only as the first differential reaction element 23 but also as the second differential reaction element 25.

Specifically, the differential mechanism 3 comprises: a set of first planetary gears 26, a set of second planetary gears 27, and a set of third planetary gears 28; a first sun gear 29, a second sun gear 30, and a third sun gear 31; and the carrier 32. The first planetary gear 26, the second planetary gear 27, and the third planetary gear 28 are arranged coaxially on a planetary pinion, and a plurality of the planetary pinions are arranged around the first sun gear 29, the second sun gear 30, and the third sun gear 31 also arranged coaxially to one another. Those planetary pinions on which the first planetary gear 26, the second planetary gear 27, and the third planetary gear 28 are arranged respectively, are supported by the carrier 32 in a rotatable manner. Therefore, the first planetary gears 26, the second planetary gears 27, and the third planetary gears 28 are allowed to revolve around the first sun gear 29, the second sun gear 30, and the third sun gear 31, respectively.

Specifically, each of the planetary pinions on which the first planetary gear 26, the second planetary gear 27, and the third planetary gear 28 are formed is individually supported by a planetary gear shaft 33 fixed to the carrier 32 so that the first planetary gear 26, the second planetary gear 27, and the third planetary gear 28 rotate integrally around the planetary gear shaft 33. That is, on the planetary pinion, the first planetary gear 26, the second planetary gear 27, and the third planetary gear 28 are not allowed to rotate relatively to one another. The first sun gear 29, the second sun gear 30, and the third sun gear 31 are supported by the case 9 while being allowed to rotate relatively to one another, and the first planetary gears 26 engage with the first sun gear 29, the second planetary gears 27 engage with the second sun gear 30, and the third planetary gears 28 engage with the third sun gear 31, respectively.

A third sun gear shaft 34 rotated integrally with the third sun gear 31 is joined to the input member 2 so that the input member 2 is rotated integrally with the third sun gear shaft 34. That is, the third sun gear 31 is rotated integrally with the input member 2. In the torque vectoring device 1 according to the first example, therefore, the torque of the motor 10 or the brake device 11 as a prime mover is delivered to the third sun gear 31 through the reduction gear train 16 and the input member 2. Accordingly, the third sun gear 31 serves as the power input element 21 of the differential mechanism 3.

The first sun gear 29 is fitted onto the first rotary shaft 4 to rotate integrally with the first rotary shaft 4. That is, the torque delivered to the differential mechanism 3 is partially delivered from the first sun gear 29 to the first rotary shaft 4. Accordingly, the first sun gear 29 serves as the first power output element 22 of the differential mechanism 3.

The second sun gear 30 is fitted onto the second rotary shaft 5 to rotate integrally with the second rotary shaft 5. That is, the torque delivered to the differential mechanism 3 is partially delivered from the second sun gear 30 to the second rotary shaft 5. Accordingly, the second sun gear 30 serves as the second power output element 24 of the differential mechanism 3.

The planetary gear shaft 33 rotated integrally with the carrier 32 is connected to an output shaft 35 of the actuator 6 through a speed reducing gear set 46 so that the control torque generated by the actuator 6 is delivered to the carrier 32 through the speed reducing gear set 46 and the planetary gear shaft 33. As explained later, the control torque delivered from the actuator 6 to the carrier 32 acts as a reaction force against the torque delivered from the power input element 21 to the first power output element 22 and the second power output element 24. In the differential mechanism 3, accordingly, the carrier 32 serves not only as the first differential reaction element 23 but also as the second differential reaction element 25.

Thus, in the first power transmission gear set 19 of the differential mechanism 3, the third sun gear 31 serves as the power input element 21, the first sun gear 29 serves as the first power output element 22, and the carrier 32 serves as the first differential reaction element 23. On the other hand, in the second power transmission gear set 20 of the differential mechanism 3, the third sun gear 31 serves as the power input element 21, the second sun gear 30 serves as the second power output element 24, and the carrier 32 serves as the second differential reaction element 25.

As described, the control torque delivered from the actuator 6 to the carrier 32 serving as the first differential reaction element 23 and the second differential reaction element 25 acts as the reaction force against the torque delivered from the power input element 21 to the first power output element 22 and the second power output element 24. Therefore, the first power output element 22 and the second power output element 24 are allowed to rotate at different speeds.

The first rotary shaft 4 and the second rotary shaft 5 are arranged coaxially along a rotational center axis AL while being allowed to rotate relatively to each other. The first power transmission gear set 19 is formed around the first rotary shaft 4, and the second power transmission gear set 20 is formed around the second rotary shaft 5. An axially outer end (i.e., the left end in FIG. 1) of the first rotary shaft 4 protrudes from the case 9 while being supported in a rotatable manner, and an axially outer end (i.e., the right end in FIG. 1) of the second rotary shaft 5 protrudes from the case 9 while being supported in a rotatable manner.

An axially inner end of the first rotary shaft 4 is connected to the first power output element 22, and an axially inner end of the second rotary shaft 5 is connected to the second power output element 24. That is, a differential rotation between the first rotary shaft 4 and the second rotary shaft 5 is allowed by the differential mechanism 3. Specifically, when the vehicle on which the torque vectoring device 1 is mounted makes a turn, an inner wheel connected to one of the first rotary shaft 4 and the second rotary shaft 5 and an outer wheel connected to the other one of the first rotary shaft 4 and the second rotary shaft 5 are allowed to rotate at different speeds. In this situation, a torque distribution ratio to the inner wheel and to the outer wheel may be altered by changing the control torque of the actuator 6.

In order to rotate the first rotary shaft 4 and the second rotary shaft 5 at different speeds, the control torque generated by the actuator 6 is applied to the first differential reaction element 23 and the second differential reaction element 25 of the differential mechanism 3. In a case of using an electric motor as the actuator 6 to generate the control torque, the electric motor generates not only a drive torque to rotate the first differential reaction element 23 and the second differential reaction element 25 but also a regenerative torque to brake the first differential reaction element 23 and the second differential reaction element 25. Instead, a brake mechanism may also be adopted as the actuator 6 to generate the control torque. For example, an electromagnetic brake that generates a magnetic attraction force when energized, and an electric brake that generates a frictional braking force by actuating a feed screw mechanism by an electric motor may also be adopted as the actuator 6. In this case, the actuator 6 generates a brake torque applied to the first differential reaction element 23 and the second differential reaction element 25.

According to the first example, an electric motor 36 is adopted as the actuator 6, and a rotor shaft of the electric motor 36 serves as the output shaft 35. The output shaft 35 of the electric motor 36 is connected to the planetary gear shaft 33 of the carrier 32 through the torque vectoring device 1.

The electric motor 36 is arranged coaxially with the first rotary shaft 4 and the second rotary shaft 5 around the rotational center axis AL to generate the torque to rotate the output shaft 35. For example, a permanent magnet type synchronous motor or an induction motor may be adopted as the electric motor 36.

In the case of using the electric motor 36 as the actuator 6, a speed difference between the first rotary shaft 4 and the second rotary shaft 5 is controlled by controlling the control torque generated by the electric motor 36. By contrast, the differential rotation between the first rotary shaft 4 and the second rotary shaft 5 may also be restricted by the regenerative torque of the electric motor 36.

In order to allow the first rotary shaft 4 and the second rotary shaft 5 to rotate in opposite directions when those shafts 4 and 5 are rotated at different speeds, the reversing mechanism 7 is formed coaxially with the first rotary shaft 4 and the second rotary shaft 5. The reversing mechanism 7 comprises a first control gear set 37 as a planetary gear set and a second control gear set 38 as a planetary gear set arranged coaxially around the first rotary shaft 4 and the second rotary shaft 5. The first control gear set 37 transmits the control torque of the actuator 6 to the first rotary shaft 4 through the first differential reaction element 23 of the differential mechanism 3, and the second control gear set 38 transmits the control torque of the actuator 6 to the second rotary shaft 5 through the second differential reaction element 25 of the differential mechanism 3.

When the first rotary shaft 4 and the second rotary shaft 5 rotate in the same direction at a same speed, the reversing mechanism 7 is rotated passively together with the power input element 21 (i.e., the third sun gear 31), the first power output element 22 (i.e., the first sun gear 29), and the second power output element 24 (i.e., the second sun gear 30).

The first control gear set 37 comprises a control input element 39, a first control output element 40, the set of the first planetary gears 26, and a first gear 41. Specifically, the control torque of the actuator 6 is applied to the control input element 39, and the control torque is delivered from the first control output element 40 to the first rotary shaft 4. In the reversing mechanism 7, the control torque is delivered to the first planetary gears 26 from the control input element 39, and the first gear 41 engages with the first planetary gears 26 to serve as the first control output element 40. On the other hand, the second control gear set 38 comprises the control input element 39 which is also employed in the first control gear set 37, a second control output element 42 which delivers the control torque to the second rotary shaft 5, the set of the second planetary gears 27, and a second gear 43. In the reversing mechanism 7, the control torque is delivered to the second planetary gears 27 from the control input element 39, and the second gear 43 engages with the second planetary gears 27 to serve as the second control output element 42.

The reversing mechanism 7 comprises: the set of the first planetary gears 26, the set of the second planetary gears 27, and the set of the third planetary gears 28; the first sun gear 29, the second sun gear 30, and the third sun gear 31; and the carrier 32. In the reversing mechanism 7, the carrier 32 serves as the control input element 39 of the first control gear set 37, and the first sun gear 29 engaging with the first planetary gears 26 serves not only as the first control output element 40 but also as the first gear 41 of the first control gear set 37. The carrier 32 also serves as the control input element 39 of the second control gear set 38, and the second sun gear 30 engaging with the second planetary gears 27 serves not only as the second control output element 42 but also as the second gear 43 of the second control gear set 38.

A first gear train 44 includes the set of the first planetary gears 26 and the first gear 41, and a second gear train 45 includes the set of the second planetary gears 27 and the second gear 43. A gear ratio of the first gear train 44 and a gear ratio of the second gear train 45 are different from each other. Specifically, a gear ratio between each of the first planetary gears 26 and the first sun gear 29 in the first gear train 44 is different from a gear ratio between each of the second planetary gears 27 and the second sun gear 30 in the second gear train 45. According to the first example, the number of teeth of the first sun gear 29, the number of teeth of the second sun gear 30, and the number of teeth of the third sun gear 31 are equal to one another. On the other hand, the number of teeth of the first planetary gear 26, the number of teeth of the second planetary gear 27, and the number of teeth of the third planetary gear 28 are smaller, respectively, than the number of teeth of the first sun gear 29, the number of teeth of the second sun gear 30, and the number of teeth of the third sun gear 31. Specifically, the number of teeth of the first sun gear 29, the number of teeth of the second sun gear 30, and the number of teeth of the third sun gear 31 are 40, respectively. On the other hand, the number of teeth of each of the first planetary gears 26 is 21, the number of teeth of each of the second planetary gears 27 is 19, and the number of teeth of each of the third planetary gears 28 is 20. That is, the number of teeth of the first planetary gear 26 is larger than the number of teeth of the third planetary gear 28, and the number of teeth of the second planetary gear 27 is smaller than the number of teeth of the third planetary gear 28.

For example, given that the number of teeth of the first planetary gear 26 is $z_{P1}$ and that the number of teeth of the first sun gear 29 is $z_{S1}$, the gear ratio $u_1$ of the first gear train 44 may be expressed as:

$$u_1 = z_{P1}/z_{S1}.$$

Specifically, given that the number of teeth $z_{P1}$ of the first planetary gear 26 is 21 and that the number of teeth $z_{S1}$ of the first sun gear 29 is 40, the gear ratio $u_1$ of the first gear train 44 is:

$$u_1 = 0.525.$$

Likewise, given that the number of teeth of the second planetary gear 27 is $z_{P2}$ and that the number of teeth of the second sun gear 30 is $z_{S2}$, the gear ratio $u_2$ of the second gear train 45 may be expressed as:

$$u_2 = z_{P2}/z_{S2}.$$

Specifically, given that the number of teeth $z_{P2}$ of the second planetary gear 27 is 19 and that the number of teeth $z_{S2}$ of the second sun gear 30 is 40, the gear ratio $u_2$ of the second gear train 45 is:

$$u_2 = 0.475.$$

Thus, the number of teeth $z_{P1}$ of the first planetary gear 26 and the number of teeth $z_{P2}$ of the second planetary gear 27 are different from each other, and hence the gear ratio $u_1$ of the first gear train 44 and the gear ratio $u_2$ of the second gear train 45 are different from each other.

Therefore, given that the first rotary shaft 4 and the second rotary shaft 5 are rotated at the same speed to transmit torque, interference is caused between the first gear train 44 of the first control gear set 37 and the second gear train 45 of the second control gear set 38. Specifically, the number of teeth $z_{P1}$ of each of the first planetary gears 26 in the first gear train 44 is 21, and the number of teeth $z_{P3}$ of each of the third planetary gears 28 in the gear train including the third sun gear 31 and the third planetary gears 28 is 20. That is, the number of teeth $z_{P1}$ of the first planetary gear 26 is one more than the number of teeth $z_{P3}$ of the third planetary gear 28 so that a rotational speed of the first sun gear 29 in the first gear train 44 is increased higher than a rotational speed of the third sun gear 31 by the one more tooth of the first planetary gear 26. On the other hand, the number of teeth $z_{P2}$ of each of the second planetary gears 27 is 19, and the number of teeth $z_{P3}$ of each of the third planetary gears 28 in the gear train including the third sun gear 31 and the third planetary gears 28 is 20. That is, the number of teeth $z_{P2}$ of the second planetary gear 27 is one less than the number of teeth $z_{P3}$ of the third planetary gear 28 so that a rotational speed of the second sun gear 30 in the second gear train 45 is reduced lower than a rotational speed of the third sun gear 31 by the reduction in the number of teeth $z_{P2}$ of the second planetary gear 27. Consequently, the first sun gear 29 and the second sun gear 30 are rotated in opposite directions. In this situation, the first planetary gears 26 engaging with the first sun gear 29 and the second planetary gears 27 engaging with the second sun gear 30 rotate and revolve integrally. That is, the first planetary gears 26 and the second planetary gears 27 do not rotate relatively to each other. Therefore, torques are applied to an engagement site of the first gear train 44 and to an engagement site of the second gear train 45 in opposite directions thereby causing an interference between the first gear train 44 and the second gear train 45. Consequently, the reversing mechanism 7 is substantially brought into engagement to rotate integrally so that the first rotary shaft 4 and the second rotary shaft 5 are rotated integrally without rotating relatively to each other.

By contrast, given that the first rotary shaft 4 and the second rotary shaft 5 are rotated at different speeds, the reversing mechanism 7 will not be brought into engagement due to interference between the first gear train 44 and the second gear train 45. In this case, the first control gear set 37 is allowed to transmit torque in accordance with the gear ratio $u_1$ of the first gear train 44, and the second control gear set 38 is allowed to transmit torque in accordance with the gear ratio $u_2$ of the second gear train 45. In the torque vectoring device 1 shown in FIG. 1, the reversing mechanism 7 in engagement is released by rotating the first gear train 44 and the second gear train 45 at different speeds. In this situation, as described, torques are applied to the engagement site of the first gear train 44 and to the engagement site of the second gear train 45 in opposite directions so that the first sun gear 29 and the second sun gear 30 are rotated relatively in opposite directions. That is, the rotational direction of the second sun gear 30 is reversed to the opposite direction to the rotational direction of the first sun gear 29. Consequently, the first rotary shaft 4 and the second rotary shaft 5 are rotated differentially in opposite directions.

In the reversing mechanism 7, a first speed reducing ratio as a ratio of a speed of the first control output element 40 to a speed of the control input element 39 is greater than 1, and a second speed reducing ratio as a ratio of a speed of the second control output element 42 to the speed of the control input element 39 is also greater than 1. Specifically, the first speed reducing ratio between the carrier 32 and the first sun gear 29, and the second speed reducing ratio between the carrier 32 and the second sun gear 30 are greater than 1, respectively. That is, the first control gear set 37 serves as a reduction gear mechanism that reduces an output speed from the first sun gear 29 lower than an input speed to the carrier 32, and the second control gear set 38 also serves as a speed reducing mechanism that reduces an output speed from the second sun gear 30 lower than the input speed to the carrier 32. Therefore, the control torque of the actuator 6 applied to the carrier 32 is transmitted to the first rotary shaft 4 and the second rotary shaft 5 while being multiplied.

As described, according to the first example, the number of teeth $z_{P1}$ of the first planetary gear 26 is 21, the number of teeth $z_{S1}$ of the first sun gear 29 is 40, the number of teeth $z_{P2}$ of the second planetary gear 27 is 19, the number of teeth $z_{S2}$ of the second sun gear 30 is 40, the number of teeth $z_{P3}$ of the third planetary gear 28 is 20, and the number of teeth $z_{S3}$ of the third sun gear 31 is 40. According to the first example, therefore, the first speed reducing ratio $R_1$ of the first control gear set 37 may be expressed as:

$$R_1 = 1/\{1-(z_{S3}/z_{P3}) \cdot (z_{P1}/z_{S1})\} = -20; \text{ and}$$

the second speed reducing ratio $R_2$ of the second control gear set 38 may be expressed as:

$$R_2 = 1/\{1-(z_{S3}/z_{P3}) \cdot (z_{P2}/z_{S2})\} = 20.$$

In general, a speed reducing ratio achieved by the conventional planetary gear sets falls within a range of approximately 4 to 10. Thus, the speed reducing ratios of the first control gear set 37 and the second control gear set 38 are greater than the speed reducing ratio of the conventional planetary gear sets.

In the first control gear set 37, the first differential reaction element 23 of the differential mechanism 3 (i.e., the carrier 32) and the first power output element 22 of the differential mechanism 3 (i.e., the first sun gear 29) are rotated in the same direction to transmit the control torque therebetween. By contrast, in the second control gear set 38, the rotational direction of the second power output element 24 of the differential mechanism 3 (i.e., the second sun gear 30) is reversed to the opposite direction to the rotational direction of the second differential reaction element 25 of the differential mechanism 3 (i.e., the carrier 32) to transmit the control torque therebetween. That is, given that the rotational direction of one of the first power output element 22 of the first control gear set 37 and the second power output element 24 of the second control gear set 38 is defined as the forward direction, the rotational direction of the other one of the first power output element 22 and the second power output element 24 is defined as the reverse or counter direction. In the description of the present disclosure, therefore, the first speed reducing ratio $R_1$ of the first control gear set 37 is indicated as a negative value (e.g., -20) for the sake of convenience, and in FIG. 1, the speed reducing ratio R of the reversing mechanism 7 between the actuator 6 and the first rotary shaft 4 or the second rotary shaft 5 is indicated commonly as R=±20.

The torque vectoring device 1 further comprises a speed increasing gear set 52 and the speed reducing gear set 46 arranged coaxially with the reversing mechanism 7, the first rotary shaft 4, and the second rotary shaft 5. The speed reducing gear set 46 is disposed between the actuator 6 and the carrier 32 of the differential mechanism 3 so as to transmit the control torque of the actuator 6 to the differential mechanism 3 and the reversing mechanism 7 while multiplying. Specifically, when the input member 2, the first rotary shaft 4, and the second rotary shaft 5 are rotated integrally, a rotational speed of the carrier 32 of the differential mechanism 3 is reduced lower than a rotational speed of the output shaft 35 of the actuator 6 by the speed reducing gear set 46.

The speed reducing gear set 46 is a single-pinion planetary gear set comprising a reduction sun gear 47, a reduction carrier 48, a reduction ring gear 49, and a set of planetary gears 50.

Specifically, the reduction sun gear 47 is formed around one end of the hollow output shaft 35 of the actuator 6 that is supported by the case 9 in a rotatable manner. That is, the reduction sun gear 47 is rotated integrally with the output shaft 35.

The reduction carrier 48 supports the planetary gears 50 in a rotatable manner. Specifically, the carrier 32 of the differential mechanism 3 serves as the reduction carrier 48, that is, the reduction carrier 48 is rotated integrally with the carrier 32 of the differential mechanism 3. As explained later, when the input member 2, the first rotary shaft 4, and the second rotary shaft 5 are rotated integrally, a rotational speed of the reduction carrier 48 is reduced lower than a rotational speed of the reduction ring gear 49.

The reduction ring gear 49 as an internal gear is meshed with the planetary gears 50 while being supported by the case 9 in a rotatable manner. Specifically, the reduction ring gear 49 is connected to an after-mentioned speed increasing ring gear 55 of the speed increasing gear set 52 through a connection member 51 as a cover member covering the planetary gears 26, 27, 28, and sun gears 29, 30, 31 of the reversing mechanism 7 or the differential mechanism 3. That is, the reduction ring gear 49 is rotated integrally with the connection member 51 and the speed increasing ring gear 55.

Specifically, when the reduction sun gear 47 is rotated by the control torque delivered from the output shaft 35, the reduction ring gear 49 serves as a reaction element of the speed reducing gear set 46 so that a rotational speed of the reduction carrier 48 is reduced lower than a rotational speed of the reduction sun gear 47. That is, the speed reducing gear set 46 serves as a speed reducing mechanism of the actuator 6 so that the control torque of the actuator 6 is delivered to the carrier 32 while being multiplied by the speed reducing gear set 46.

As indicated in FIG. 1, the number of teeth of the reduction sun gear 47 is 24, the number of teeth of the reduction ring gear 49 is 60, and the number of teeth of each of the planetary gears 50 is 18. Accordingly, a speed reducing ratio of the speed reducing gear set 46 is 3.5. Therefore, as indicated in FIG. 1, an actual speed reducing ratio R' of the reversing mechanism 7 between the actuator 6 and the first rotary shaft 4 or the second rotary shaft 5 taking into account the speed reducing ratio of the speed reducing gear set 46 is:

$$R' = \pm 20 \cdot 3.5 = \pm 70.$$

Thus, the speed reducing ratio of the reversing mechanism 7 is increased by the speed reducing gear set 46.

In the torque vectoring device 1 according to the first example, each of the first control gear set 37 and the second control gear set 38 of the reversing mechanism 7 individually serves as a reduction gear mechanism whose speed reducing ratio is greater than 1. That is, the reversing mechanism 7 has not only a reversing function to allow the first rotary shaft 4 and the second rotary shaft 5 to rotate in the opposite directions when the first rotary shaft 4 and the second rotary shaft 5 rotate at different speeds, but also a torque multiplying function (or speed reducing function) to multiply the control torque generated by the actuator 6. Specifically, according to the first example, the speed reducing ratio of the reversing mechanism 7 to multiply the control torque of the actuator 6 is 20 (but the actual speed reducing ratio is 70). In the torque vectoring device 1 according to the first example, therefore, the actuator 6 can be downsized to reduce the size of the torque vectoring device 1.

In addition, according to the first example, the reversing mechanism 7 has a simple uniaxial structure. According to the first example, therefore, the reversing mechanism 7 serving not only as a reversing mechanism but also as a speed reducing mechanism may be formed easily. Moreover, since the reversing mechanism 7 is formed coaxially around the first rotary shaft 4 and the second rotary shaft 5, the size of the torque vectoring device 1 is not increased in the radial direction. Further, since the reversing mechanism 7 may serve as the speed reducing mechanism, the actuator 6 may be downsized. For these reasons, the torque vectoring device 1 may be mounted on a vehicle easily.

Here, it is to be noted that an arrangement of the set of the first planetary gears 26, the set of the second planetary gears 27, and the set of the third planetary gears 28, and an arrangement of the first sun gear 29, the second sun gear 30, and the third sun gear 31 should not be limited to those shown in FIG. 1. For example, positions of the set of the first planetary gears 26 and the first sun gear 29 may be switched with positions of the set of the second planetary gears 27 and the second sun gear 30. Instead, the set of the third planetary gears 28 and the third sun gear 31 may also be arranged at the right side in FIG. 1.

As described, when the first rotary shaft 4 and the second rotary shaft 5 rotate in the same direction at a same speed, the differential mechanism 3 (and the reversing mechanism 7) is rotated passively. In this situation, if the actuator 6 is also rotated passively, a power transmitting efficiency of the torque vectoring device 1 will be reduced. In addition, an additional control is required to generate a cancel torque against an inertia torque of the actuator 6. In order to prevent the actuator 6 from being rotated passively, according to the first example, the torque vectoring device 1 is further provided with the speed increasing gear set 52.

The speed increasing gear set 52 is also arranged coaxially with the first rotary shaft 4 and the second rotary shaft 5. The speed increasing gear set 52 is a single-pinion planetary gear set comprising a speed increasing sun gear 53, a speed increasing carrier 54, the speed increasing ring gear 55, and a set of planetary gears 56.

The speed increasing sun gear 53 may be formed around a hollow shaft, and is not allowed to rotate. According to the first example, the speed increasing sun gear 53 is fitted onto a flange (not shown) formed integrally with the case 9.

The speed increasing carrier 54 supports the planetary gears 56 in a rotatable manner. Specifically, the speed increasing carrier 54 is connected to the input member 2 through the third sun gear shaft 34 so that the speed increasing carrier 54 is rotated integrally with the third sun gear shaft 34 and the input member 2.

The speed increasing ring gear 55 as an internal gear is meshed with the planetary gears 56 while being supported by the case 9 in a rotatable manner together with the reduction ring gear 49 of the speed reducing gear set 46. As described, the speed increasing ring gear 55 is connected to the reduction ring gear 49 through the connection member 51 so that the speed increasing ring gear 55 is rotated integrally with the reduction ring gear 49. When the speed increasing carrier 54 is rotated, a rotational speed of the speed increasing ring gear 55 is increased higher than a rotational speed of the speed increasing carrier 54.

Specifically, when the speed increasing carrier 54 is rotated by the torque delivered from the input member 2, the speed increasing sun gear 53 serves as a reaction element of the speed increasing gear set 52 so that a rotational speed of the speed increasing ring gear 55 is increased higher than a rotational speed of the speed increasing carrier 54. Thus, the speed increasing gear set 52 serves as a speed increasing mechanism.

As indicated in FIG. 1, the number of teeth of the speed increasing sun gear 53 is 24, the number of teeth of the speed increasing ring gear 55 is 60, and the number of teeth of each of the planetary gears 56 is 18. Thus, the number of teeth of the speed increasing sun gear 53 is equal to that of the reduction sun gear 47, the number of teeth of the speed increasing ring gear 55 is equal to that of the reduction ring gear 49, and the number of teeth of the planetary gear 56 is equal to that of the planetary gear 50. Accordingly, a gear ratio (or speed ratio) of the speed increasing gear set 52 is equal to that of the speed reducing gear set 46.

As described, when the first rotary shaft 4 and the second rotary shaft 5 rotate in the same direction at the same speed, the differential mechanism 3 and the reversing mechanism 7 are rotated integrally and passively. Consequently, the speed increasing carrier 54 of the speed increasing gear set 52 and the reduction carrier 48 of the speed reducing gear set 46 are rotated in the same direction at the same speed. In this situation, the speed increasing gear set 52 in which the speed increasing sun gear 53 is fixed serves as a speed increasing mechanism to increase a rotational speed of the speed increasing ring gear 55 higher than a rotational speed of the speed increasing carrier 54. On the other hand, the speed reducing gear set 46 serves as a speed reducing mechanism to reduce a rotational speed of the reduction carrier 48 lower than a rotational speed of the reduction ring gear 49. As described, the speed increasing carrier 54 and the reduction carrier 48 are rotated at the same speed. Since the reduction ring gear 49 and the speed increasing ring gear 55 are connected to each other, the reduction ring gear 49 and the speed increasing ring gear 55 are also rotated at a same speed. Consequently, an absolute value of the speed increasing ratio of the speed increasing gear set 52 and an absolute value of the speed reducing ratio of the speed reducing gear set 46 are equalized to each other. In this situation, since a rotational speed of the speed increasing sun gear 53 is zero, the rotational speed of the reduction sun gear 47 is reduced to substantially zero that is lower than the rotational speed of the reduction ring gear 49, in accordance with the gear ratio of the speed reducing gear set 46. That is, since the gear ratio of the speed increasing gear set 52 and the gear ratio of the speed reducing gear set 46 are equal to each other, the rotational speed of the reduction sun gear 47 is reduced to substantially zero. Therefore, when the first rotary shaft 4 and the second rotary shaft 5 rotate in the same direction at the same speed so that the differential mechanism 3 and the reversing mechanism 7 are rotated integrally and passively, a rotational speed of the output shaft 35 of the actuator 6 connected to the reduction sun gear 47 is maintained to zero. Consequently, the actuator 6 can be prevented from being rotated passively.

By thus preventing the passive rotation of the actuator 6, according to the first example, a power transmission efficiency and an energy efficiency of the torque vectoring device 1 can be improved. In addition, since the actuator 6 is not rotated passively when the vehicle travelling in a straight line, the torque vectoring device 1 will not be subjected to an inertia torque of the actuator 6 even if the vehicle is accelerated or decelerated abruptly. For this reason, it is not necessary to execute an additional control to generate a cancel torque against an inertia torque of the actuator 6. That is, a torque vectoring control of the actuator 6 can be simplified.

Other examples of the torque vectoring device 1 are shown in FIGS. 2 to 5. In the following explanations, common reference numerals are allotted to the elements in common with those of the torque vectoring device 1 according to the first example.

Second Example

Figure 2:
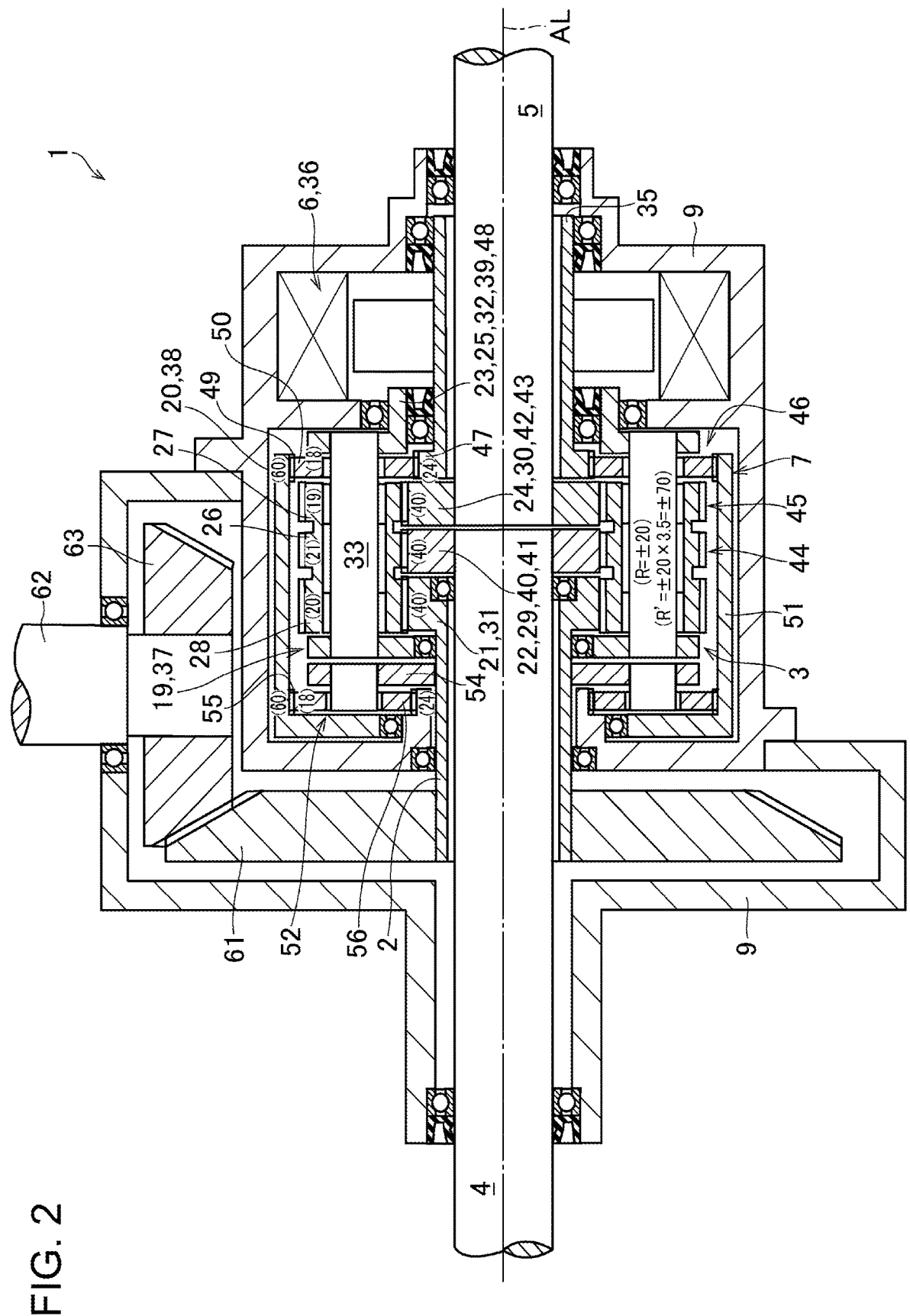
FIG. 2 is a cross-sectional view showing a structure of the torque vectoring device according to the second example of the present disclosure.

Turning to FIG. 2, there is shown the second example of the torque vectoring device 1 according to the present disclosure. The torque vectoring device 1 shown in FIG. 2 is designed to be arranged in the lateral direction of the vehicle. To this end, in the torque vectoring device 1 shown in FIG. 2, the first rotary shaft 4 and the second rotary shaft 5 extend coaxially in the lateral direction of the vehicle (i.e., along the rotational center axis AL shown in FIG. 2).

In the torque vectoring device 1 shown in FIG. 2, an input gear 61 is fitted onto the input member 2 to be rotated integrally with the input member 2. Specifically, the input gear 61 is a diametrically larger bevel gear, and is engaged with a diametrically smaller bevel gear 63 fitted onto a leading end (i.e., a lower end in FIG. 2) of a propeller shaft 62.

Specifically, the propeller shaft 62 extends perpendicular to the rotational center axis AL. The diametrically smaller bevel gear 63 is mounted on or formed integrally with the leading end of the propeller shaft 62 so that the diametrically smaller bevel gear 63 is rotated integrally with the propeller shaft 62. The other end of the propeller shaft 62 is joined to an output shaft (not shown) of the prime mover such as an engine or a motor. That is, the input member 2 is connected to the prime mover through the input gear 61, the diametrically smaller bevel gear 63, and the propeller shaft 62.

Thus, the torque vectoring device 1 according to the present disclosure may be mounted on the vehicle in such a manner that the first rotary shaft 4 and the second rotary shaft 5 extend coaxially in the lateral direction of the vehicle. In this case, the torque vectoring device 1 having the built-in actuator 6 serves as a differential mechanism to allow a right driveshaft and a left driveshaft to rotate at different speeds. Since the actuator 6 is arranged in the torque vectoring device 1, the torque vectoring device 1 may be arranged easily in the vehicle. In addition, a torque distribution ratio and a differential rotation between a right wheel and a left wheel may be controlled effectively by the control torque generated by the actuator 6.

Third Example

Figure 3:
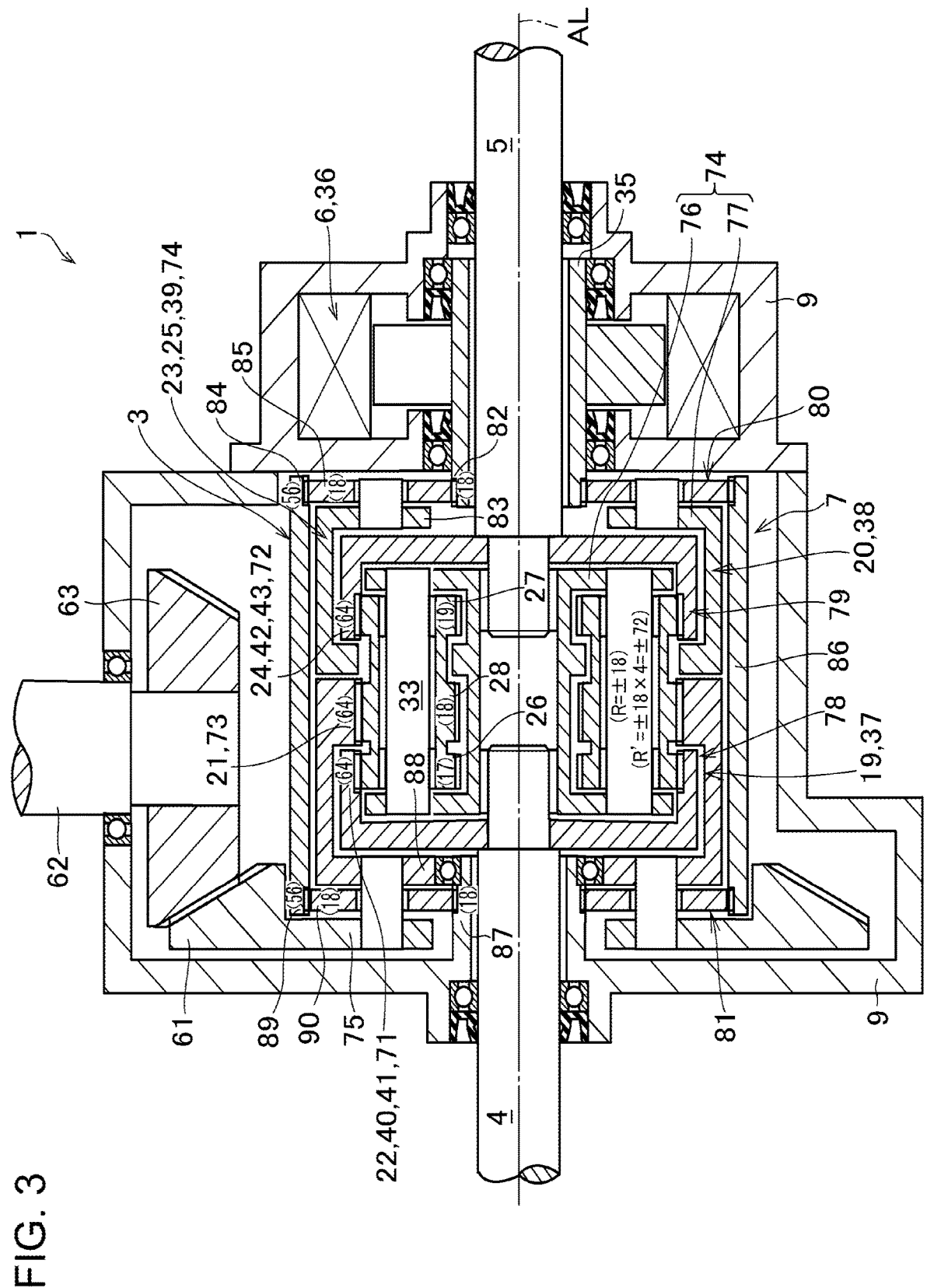
FIG. 3 is a cross-sectional view showing a structure of the torque vectoring device according to the third example of the present disclosure.

Turning to FIG. 3, there is shown the third example of the torque vectoring device 1 according to the present disclosure. According to the third example, the differential mechanism 3 comprises: the set of the first planetary gears 26, the set of the second planetary gears 27, and the set of the third planetary gears 28; a first ring gear 71, a second ring gear 72, and a third ring gear 73; and a carrier 74. The first planetary gear 26, the second planetary gear 27, and the third planetary gear 28 are formed integrally and coaxially on the planetary pinion, and the third planetary gear 28 is situated between the first planetary gear 26 and the second planetary gear 27. The first ring gear 71, the second ring gear 72, and the third ring gear 73 are also arranged coaxially to one another while being allowed to rotate relatively to one another, and the third ring gear 73 is situated between the first ring gear 71 and the second ring gear 72. Specifically, the first ring gear 71 engages with the first planetary gears 26, the second ring gear 72 engages with the second planetary gears 27, and the third ring gear 73 engages with the third planetary gears 28.

The first ring gear 71 is connected to the first rotary shaft 4 to rotate integrally with the first rotary shaft 4, the second ring gear 72 is connected to the second rotary shaft 5 to rotate integrally with the second rotary shaft 5, and the third ring gear 73 is connected to an input member 75. A speed increasing carrier 88 of an after-mentioned speed increasing gear set 81 is also connected to the input member 75 so that the third ring gear 73, the speed increasing carrier 88, and the input member 75 are rotated integrally. Specifically, the input member 75 is a disc-shaped member partially serving as the speed increasing carrier 88, and the input member 75 is supported by the case 9 in a rotatable manner. The input gear 61 is fitted onto or formed around the input member 75 so that the output torque of the prime mover is delivered to the third ring gear 73 through the input member 75 and the speed increasing carrier 88. The torque delivered to the third ring gear 73 is further delivered from the third planetary gears 28 to the first planetary gear 26 and the second planetary gear 27.

The carrier 74 comprises a retainer 76 and a flange 77. Specifically, the retainer 76 supports the planetary gear shafts 33 individually supporting the first planetary gear 26, the second planetary gear 27, and the third planetary gears 28. On the other hand, the flange 77 is formed around the retainer 76 or attached to an outer circumferential portion of the retainer 76. Although the retainer 76 is illustrated separately from the flange 77 in FIG. 3, the retainer 76 is in fact connected to the flange 77 to be rotated integrally with the flange 77. The flange 77 serves as a reduction carrier 83 of an after-mentioned speed reducing gear set 80, and the flange 77 is supported by the case 9 in a rotatable manner through the speed reducing gear set 80. The speed reducing gear set 80 is disposed between the actuator 6 and the carrier 74 of the differential mechanism 3 so as to transmit the control torque of the actuator 6 to the differential mechanism 3 and the reversing mechanism 7 while multiplying.

A torque of the carrier 74 is transmitted to the first ring gear 71 through the first planetary gears 26 and to the second ring gear 72 through the second planetary gears 27. Therefore, the control torque applied to the carrier 74 from the actuator 6 through the speed reducing gear set 80 acts as a reaction force against the torque delivered from the third ring gear 73 to the first ring gear 71 through the third planetary gears 28 and the first planetary gears 26, and against the torque delivered from the third ring gear 73 to the second ring gear 72 through the third planetary gears 28 and the second planetary gears 27.

Accordingly, in the first power transmission gear set 19 of the differential mechanism 3, the third ring gear 73 serves as the power input element 21, the first ring gear 71 serves as the first power output element 22, and the carrier 74 serves as the first differential reaction element 23. On the other hand, in the second power transmission gear set 20 of the differential mechanism 3, the third ring gear 73 also serves as the power input element 21, the second ring gear 72 serves as the second power output element 24, and the carrier 74 serves as the second differential reaction element 25.

According to the third example, the reversing mechanism 7 comprises: the set of the first planetary gears 26, the set of the second planetary gears 27, and the set of the third planetary gears 28; the first ring gear 71, the second ring gear 72, and the third ring gear 73; and the carrier 74. The carrier 74 is connected to the output shaft 35 of the actuator 6. In the reversing mechanism 7, the first ring gear 71 is connected to the first rotary shaft 4 as the first power output element 22 of the differential mechanism 3 while engaging with the first planetary gears 26, and the second ring gear 72 is connected to the second rotary shaft 5 as the second power output element 24 while engaging with the second planetary gears 27.

In the reversing mechanism 7, accordingly, the carrier 74 serves as the control input element 39 of the first control gear set 37, and the first ring gear 71 serves not only as the first control output element 40 but also as the first gear 41 of the first control gear set 37. The carrier 74 also serves as the control input element 39 of the second control gear set 38, and the second ring gear 72 serves not only as the second control output element 42 but also as the second gear 43 of the second control gear set 38.

According to the third example, a first gear train 78 includes the set of the first planetary gears 26 and the first gear 41 (i.e., the first ring gear 71), and a second gear train 79 includes the set of the second planetary gears 27 and the second gear 43 (i.e., the second ring gear 72). A gear ratio of the first gear train 78 and a gear ratio of the second gear train 79 are different from each other. Specifically, a gear ratio between each of the first planetary gears 26 and the first ring gear 71 in the first gear train 78 is different from a gear ratio between each of the second planetary gears 27 and the second ring gear 72 in the second gear train 79.

According to the third example, the number of teeth of the first ring gear 71, the number of teeth of the second ring gear 72, and the number of teeth of the third ring gear 73 are equal to one another. On the other hand, the number of teeth of the first planetary gear 26, the number of teeth of the second planetary gear 27, and the number of teeth of the third planetary gear 28 are smaller, respectively, than the number of teeth of the first ring gear 71, the number of teeth of the second ring gear 72, and the number of teeth of the third ring gear 73. Specifically, the number of teeth of the first ring gear 71, the number of teeth of the second ring gear 72, and the number of teeth of the third ring gear 73 are set to 64, respectively. On the other hand, the number of teeth of each of the first planetary gears 26 is set to 17, the number of teeth of each of the second planetary gears 27 is set to 19, and the number of teeth of each of the third planetary gears 28 is set to 18. That is, the number of teeth of the first planetary gear 26 is smaller than the number of teeth of the third planetary gear 28, and the number of teeth of the second planetary gear 27 is larger than the number of teeth of the third planetary gear 28. According to the third example, therefore, the speed reducing ratio R of the torque vectoring device 1 is ±18.

Thus, according to the third example, the control torque of the actuator 6 is also multiplied by the reversing mechanism 7, therefore, the actuator 6 may be downsized. Since the reversing mechanism 7 has a simple uniaxial structure, the reversing mechanism may be assembled easily. Moreover, since the reversing mechanism 7 is formed around the first rotary shaft 4 and the second rotary shaft 5, the size of the torque vectoring device 1 is not increased in the radial direction. In addition, according to the third example, the first ring gear 71 engages with the first planetary gears 26, the second ring gear 72 engages with the second planetary gears 27, and the third ring gear 73 engages with the third planetary gears 28. According to the third example, therefore, a centrifugal force applied to the carrier 74 derived from rotation of the torque vectoring device 1 can be damped by the first ring gear 71, the second ring gear 72, and third ring gear 73. For this reason, rigidity of the carrier 74 may be reduced and hence the differential mechanism 3 and the reversing mechanism 7 may be downsized. Further, according to the third example, the first power transmission gear set 19, the second power transmission gear set 20, the first control gear set 37, and the second control gear set 38 are formed without the sun gears. According to the third example, therefore, the torque vectoring device 1 may be downsized in the radial direction.

In order to prevent the actuator 6 from being rotated passively, according to the third example, the torque vectoring device 1 is further provided with the speed reducing gear set 80 and the speed increasing gear set 81.

The speed reducing gear set 80 is disposed between the actuator 6 and the carrier 74 of the differential mechanism 3 so as to transmit the control torque of the actuator 6 to the differential mechanism 3 and the reversing mechanism 7 while multiplying. Specifically, when the input member 75, the first rotary shaft 4, and the second rotary shaft 5 are rotated integrally, a rotational speed of the carrier 74 of the differential mechanism 3 is reduced lower than a rotational speed of the output shaft 35 of the actuator 6 by the speed reducing gear set 80.

The speed reducing gear set 80 is a single-pinion planetary gear set arranged coaxially with the first rotary shaft 4 and the second rotary shaft 5. The speed reducing gear set 80 comprises a reduction sun gear 82, a reduction carrier 83, a reduction ring gear 84, and a set of planetary gears 85.

Specifically, the reduction sun gear 82 is formed around one end of the hollow output shaft 35 of the actuator 6 that is supported by the case 9 in a rotatable manner. That is, the reduction sun gear 82 is rotated integrally with the output shaft 35.

The reduction carrier 83 supports the planetary gears 85 in a rotatable manner. Specifically, the carrier 74 of the differential mechanism 3 serves as the reduction carrier 83, that is, the reduction carrier 83 is rotated integrally with the carrier 74 of the differential mechanism 3. When the input member 75, the first rotary shaft 4, and the second rotary shaft 5 are rotated integrally, a rotational speed of the reduction carrier 83 is reduced lower than a rotational speed of the reduction ring gear 84.

The reduction ring gear 84 as an internal gear is meshed with the planetary gears 85 while being supported by the case 9 in a rotatable manner through the speed increasing gear set 81. Specifically, the reduction ring gear 84 is connected to an after-mentioned speed increasing ring gear 89 of the speed increasing gear set 81 through a connection member 86 as a cover member covering the planetary gears 26, 27, 28, and ring gears 71, 72, 73 of the reversing mechanism 7 or the differential mechanism 3. That is, the reduction ring gear 84 is rotated integrally with the connection member 86 and the speed increasing ring gear 89.

Specifically, when the reduction sun gear 82 is rotated by the control torque delivered from the output shaft 35, the reduction ring gear 84 serves as a reaction element of the speed reducing gear set 80 so that a rotational speed of the reduction carrier 83 is reduced lower than a rotational speed of the reduction sun gear 82. That is, the speed reducing gear set 80 serves as a speed reducing mechanism of the actuator 6 so that the control torque of the actuator 6 is delivered to the carrier 74 while being multiplied by the speed reducing gear set 80.

As indicated in FIG. 3, the number of teeth of the reduction sun gear 82 is 18, the number of teeth of the reduction ring gear 84 is 56, and the number of teeth of each of the planetary gears 85 is 18. Accordingly, a speed reducing ratio of the speed reducing gear set 80 is approximately 4. Therefore, as indicated in FIG. 3, an actual speed reducing ratio R' of the reversing mechanism 7 between the actuator 6 and the first rotary shaft 4 or the second rotary shaft 5 taking into account the speed reducing ratio of the speed reducing gear set 80 is:

$$R'=\pm 18\cdot 4=\pm 72.$$

Thus, the speed reducing ratio of the reversing mechanism 7 is increased by the speed reducing gear set 80.

The speed increasing gear set 81 is also arranged coaxially with the first rotary shaft 4 and the second rotary shaft 5. The speed increasing gear set 81 is also a single-pinion planetary gear set comprising a speed increasing sun gear 87, a speed increasing carrier 88, the speed increasing ring gear 89, and a set of planetary gears 90.

The speed increasing sun gear 87 is formed around a hollow shaft, and is not allowed to rotate. According to the third example, the speed increasing sun gear 87 is fitted onto a flange (not shown) formed integrally with the case 9.

The speed increasing carrier 88 supports the planetary gears 90 in a rotatable manner. Specifically, one end of the speed increasing carrier 88 is connected to the input member 75 and the other end the speed increasing carrier 88 is connected to the third ring gear 73 so that the speed increasing carrier 88 is rotated integrally with the third ring gear 73 and the input member 75.

The speed increasing ring gear 89 as an internal gear is meshed with the planetary gears 90 while being supported by the case 9 in a rotatable manner together with the reduction ring gear 84 of the speed reducing gear set 80 through the planetary gears 90 and the speed increasing sun gear 87. The speed increasing ring gear 89 is connected to the reduction ring gear 84 through the connection member 86 so that the speed increasing ring gear 89 is rotated integrally with the reduction ring gear 84. When the speed increasing carrier 88 is rotated, a rotational speed of the speed increasing ring gear 89 is increased higher than a rotational speed of the speed increasing carrier 88.

Specifically, when the speed increasing carrier 88 is rotated by the torque delivered from the input member 75, the speed increasing sun gear 87 serves as a reaction element of the speed increasing gear set 81 so that a rotational speed of the speed increasing ring gear 89 is increased higher than a rotational speed of the speed increasing carrier 88. Thus, the speed increasing gear set 81 serves as a speed increasing mechanism.

As indicated in FIG. 3, the number of teeth of the speed increasing sun gear 87 is 18, the number of teeth of the speed increasing ring gear 89 is 56, and the number of teeth of each of the planetary gears 90 is 18. Thus, the number of teeth of the speed increasing sun gear 87 is equal to that of the reduction sun gear 82, the number of teeth of the speed increasing ring gear 89 is equal to that of the reduction ring gear 84, and the number of teeth of the planetary gear 90 is equal to that of the planetary gear 85. Accordingly, a gear ratio (or speed ratio) of the speed increasing gear set 81 is equal to that of the speed reducing gear set 80.

Therefore, when the first rotary shaft 4 and the second rotary shaft 5 rotate in the same direction at the same speed so that the differential mechanism 3 and the reversing mechanism 7 are rotated integrally and passively, a rotational speed of the output shaft 35 of the actuator 6 connected to the reduction sun gear 82 is maintained to zero. Consequently, the actuator 6 can be prevented from being rotated passively.

Fourth Example

Figure 4:
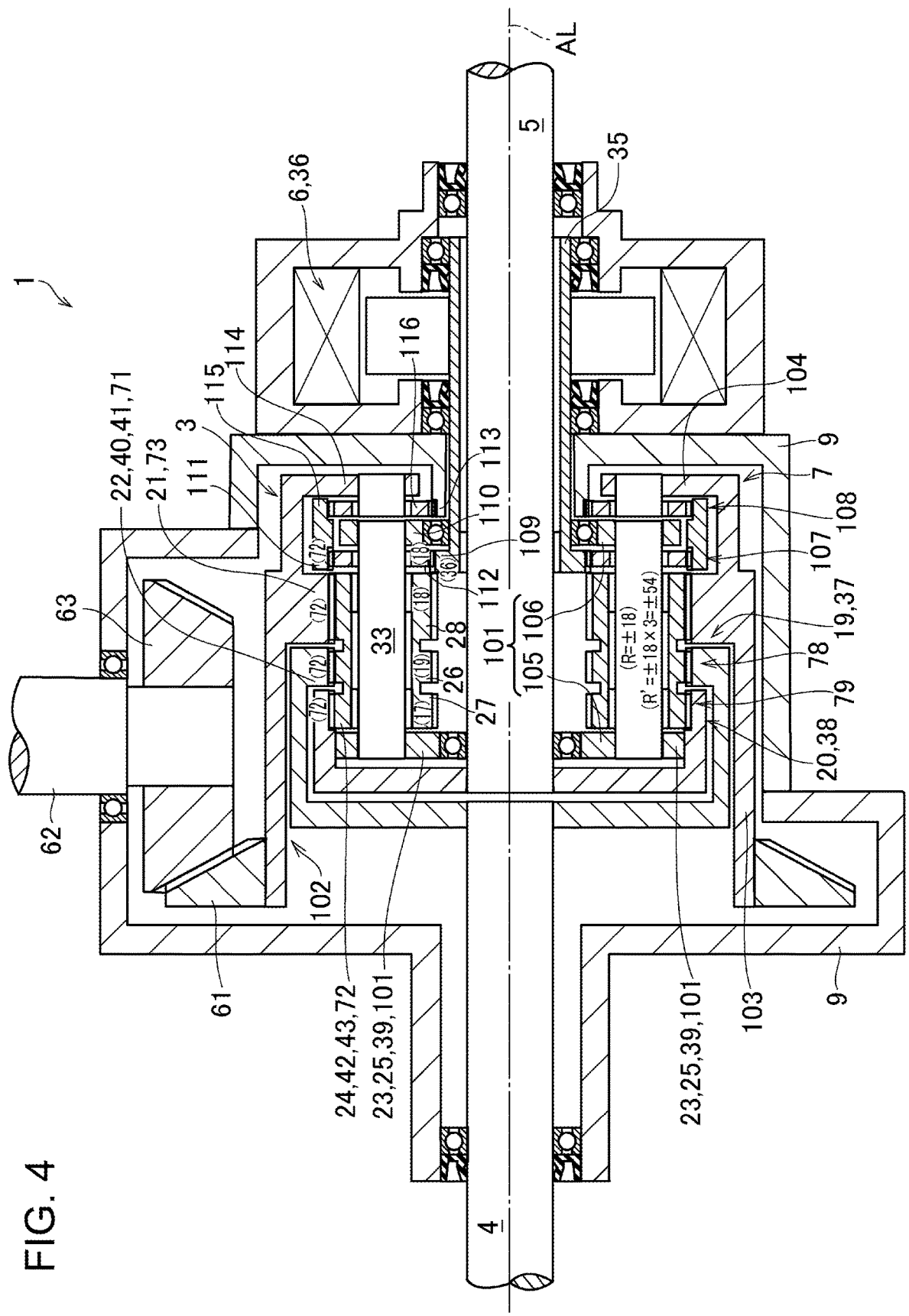
FIG. 4 is a cross-sectional view showing a structure of the torque vectoring device according to the fourth example of the present disclosure.

Turning to FIG. 4, there is shown the fourth example of the torque vectoring device 1 according to the present disclosure. According to the fourth example, the differential mechanism 3 comprises: the set of the first planetary gears 26, the set of the second planetary gears 27, and the set of the third planetary gears 28; the first ring gear 71, the second ring gear 72, and the third ring gear 73; and a carrier 101. The first planetary gear 26, the second planetary gear 27, and the third planetary gear 28 are arranged coaxially on the planetary pinion, and the third planetary gear 28 may be situated on one end of the planetary gear shaft 33. According to the fourth example, the second planetary gear 27 is situated on the left end of the planetary gear shaft 33, the third planetary gear 28 is situated on the right end of the planetary gear shaft 33, and the first planetary gear 26 is situated between the second planetary gear 27 and the third planetary gear 28. The first ring gear 71, the second ring gear 72, and the third ring gear 73 are also arranged coaxially to one another while being allowed to rotate relatively to one another, and the third ring gear 73 may be situated on one end of the planetary gear shaft 33. According to the fourth example, the first ring gear 71 engages with the first planetary gears 26, the second ring gear 72 engages with the second planetary gears 27, and the third ring gear 73 engages with the third planetary gears 28.

The first ring gear 71 is connected to the first rotary shaft 4 to rotate integrally with the first rotary shaft 4, the second ring gear 72 is connected to the second rotary shaft 5 to rotate integrally with the second rotary shaft 5, and the third ring gear 73 is connected to an input member 102. A speed increasing carrier 114 of an after-mentioned speed increasing gear set 108 is also connected to the input member 102 so that the third ring gear 73, the speed increasing carrier 114, and the input member 102 are rotated integrally. Specifically, the input member 102 comprises a cylindrical portion 103 and a flange portion 104.

The cylindrical portion 103 is a hollow shaft portion, and the planetary gears 26, 27, 28, and the ring gears 71, 72, 73 and so on are held in the cylindrical portion 103. According to the fourth example, the third ring gear 73 is attached to or formed integrally with an inner circumferential surface of the cylindrical portion 103 so that the third ring gear 73 is rotated integrally with the input member 102. The input gear 61 is fitted onto or formed around the cylindrical portion 103 so that the output torque of the prime mover is delivered to the third ring gear 73 through the input member 102. The torque delivered to the third ring gear 73 is further delivered from the third planetary gears 28 to the to the first planetary gear 26 and the second planetary gear 27.

The flange portion 104 is formed integrally with one end (i.e., the right end in FIG. 4) to serve as the speed increasing carrier 114 of the speed increasing gear set 108. Specifically, the flange portion 104 is supported in a rotatable manner by the case 9 through the speed increasing gear set 108.

The carrier 101 comprises the planetary gear shafts 33, a first plate 105 supporting one end of each of the planetary gear shafts 33, and the second plate 106 supporting other end of each of the planetary gear shafts 33. According to the fourth example, the first plate 105 is fitted onto the second rotary shaft 5 to support left ends of the planetary gear shafts 33, while being allowed to rotate relatively to the second rotary shaft 5. On the other hand, the second plate 106 is fitted onto the output shaft 35 of the actuator 6 to support right ends of the planetary gear shafts 33, while being allowed to rotate relatively to the output shaft 35.

A torque of the carrier 101 is transmitted to the first ring gear 71 through the first planetary gears 26 and to the second ring gear 72 through the second planetary gears 27. Therefore, the control torque applied to the carrier 101 from the actuator 6 through an after-mentioned speed reducing gear set 107 acts as a reaction force against the torque delivered from the third ring gear 73 to the first ring gear 71 through the third planetary gears 28 and the first planetary gears 26, and against the torque delivered from the third ring gear 73 to the second ring gear 72 through the third planetary gears 28 and the second planetary gears 27.

Accordingly, in the first power transmission gear set 19 of the differential mechanism 3, the third ring gear 73 serves as the power input element 21, the first ring gear 71 serves as the first power output element 22, and the carrier 101 serves as the first differential reaction element 23. On the other hand, in the second power transmission gear set 20 of the differential mechanism 3, the third ring gear 73 also serves as the power input element 21, the second ring gear 72 serves as the second power output element 24, and the carrier 101 serves as the second differential reaction element 25.

According to the fourth example, the reversing mechanism 7 comprises: the set of the first planetary gears 26, the set of the second planetary gears 27, and the set of the third planetary gears 28; the first ring gear 71, the second ring gear 72, and the third ring gear 73; and the carrier 101. The carrier 74 is connected to the output shaft 35 of the actuator 6. In the reversing mechanism 7, the first ring gear 71 is connected to the first rotary shaft 4 as the first power output element 22 of the differential mechanism 3 while engaging with the first planetary gears 26, and the second ring gear 72 is connected to the second rotary shaft 5 as the second power output element 24 while engaging with the second planetary gears 27.

In the reversing mechanism 7, accordingly, the carrier 101 serves as the control input element 39 of the first control gear set 37, and the first ring gear 71 serves not only as the first control output element 40 but also as the first gear 41 of the first control gear set 37. The carrier 101 also serves as the control input element 39 of the second control gear set 38, and the second ring gear 72 serves not only as the second control output element 42 but also as the second gear 43 of the second control gear set 38.

According to the fourth example, the number of teeth of the first ring gear 71, the number of teeth of the second ring gear 72, and the number of teeth of the third ring gear 73 are equal to one another. On the other hand, the number of teeth of the first planetary gear 26, the number of teeth of the second planetary gear 27, and the number of teeth of the third planetary gear 28 are smaller, respectively, than the number of teeth of the first ring gear 71, the number of teeth of the second ring gear 72, and the number of teeth of the third ring gear 73. Specifically, the number of teeth of the first ring gear 71, the number of teeth of the second ring gear 72, and the number of teeth of the third ring gear 73 are 72, respectively. On the other hand, the number of teeth of each of the first planetary gears 26 is 17, the number of teeth of each of the second planetary gears 27 is 19, and the number of teeth of each of the third planetary gears 28 is 18. That is, the number of teeth of the first planetary gear 26 is smaller than the number of teeth of the third planetary gear 28, and the number of teeth of the second planetary gear 27 is larger than the number of teeth of the third planetary gear 28. According to the third example, therefore, the speed reducing ratio R of the torque vectoring device 1 is ±18.

In order to prevent the actuator 6 from being rotated passively, according to the fourth example, the torque vectoring device 1 is further provided with the speed reducing gear set 107 and the speed increasing gear set 108.

The speed reducing gear set 107 and the speed increasing gear set 108 are arranged coaxially with the first rotary shaft 4 and the second rotary shaft 5, and in parallel to each other across the first plate 105 or the second plate 106. According to the fourth example, the speed reducing gear set 107, the second plate 106, and the speed increasing gear set 108 are arranged in order the along the rotational center axis AL from the left side in FIG. 4.

Specifically, the speed reducing gear set 107 is disposed between the actuator 6 and the carrier 101 of the differential mechanism 3 so as to transmit the control torque of the actuator 6 to the differential mechanism 3 and the reversing mechanism 7 while multiplying. When the input member 102, the first rotary shaft 4, and the second rotary shaft 5 are rotated integrally, a rotational speed of the carrier 101 of the differential mechanism 3 is reduced lower than a rotational speed of the output shaft 35 of the actuator 6 by the speed reducing gear set 107. On the other hand, the speed reducing gear set 107 is a single-pinion planetary gear set comprising a reduction sun gear 109, a reduction carrier 110, a reduction ring gear 111, and a set of planetary gears 112.

Specifically, the reduction sun gear 109 is formed around one end of the hollow output shaft 35 of the actuator 6 that is supported by the case 9 in a rotatable manner. That is, the reduction sun gear 109 is rotated integrally with the output shaft 35.

The reduction carrier 110 supports the planetary gears 112 in a rotatable manner. Specifically, the second plate 106 of carrier 101 serves as the reduction carrier 110, that is, the reduction carrier 110 is rotated integrally with the carrier 101. When the input member 102, the first rotary shaft 4, and the second rotary shaft 5 are rotated integrally, a rotational speed of the reduction carrier 110 is reduced lower than a rotational speed of the reduction ring gear 111.

The reduction ring gear 111 as an internal gear is meshed with the planetary gears 112. Specifically, the reduction ring gear 111 is connected to an after-mentioned speed increasing ring gear 115 of the speed increasing gear set 108 so that the reduction ring gear 111 is rotated integrally with the speed increasing ring gear 115.

Specifically, when the reduction sun gear 109 is rotated by the control torque delivered from the output shaft 35, the reduction ring gear 111 serves as a reaction element of the speed reducing gear set 107 so that a rotational speed of the reduction carrier 110 is reduced lower than a rotational speed of the reduction sun gear 109. That is, the speed reducing gear set 107 serves as a speed reducing mechanism of the actuator 6 so that the control torque of the actuator 6 is delivered to the carrier 101 while being multiplied by the speed reducing gear set 107.

The speed increasing gear set 108 is also arranged coaxially with the first rotary shaft 4 and the second rotary shaft 5 to be situated adjacent to (the right side of) the second plate 106 of the carrier 101. The speed increasing gear set 108 is also a single-pinion planetary gear set comprising a speed increasing sun gear 113, the speed increasing carrier 114, the speed increasing ring gear 115, and a set of planetary gears 116.

The speed increasing sun gear 113 is formed around a hollow shaft, and is not allowed to rotate. According to the fourth example, the speed increasing sun gear 113 is fitted onto a flange (not shown) formed integrally with the case 9.

The speed increasing carrier 114 supports the planetary gears 116 of the speed increasing gear set 108 in a rotatable manner. Specifically, the speed increasing carrier 114 is connected to the input member 102 through the third ring gear 73. In other words, the speed increasing carrier 114 is formed on a flange extending from the right end of the third ring gear 73 so that the speed increasing carrier 114 is rotated integrally with the third ring gear 73 and the input member 102.

The speed increasing ring gear 115 as an internal gear is meshed with the planetary gears 116. Specifically, the speed increasing ring gear 115 is connected to the reduction ring gear 111 of the speed reducing gear set 107 so that the speed increasing ring gear 115 is rotated integrally with the reduction ring gear 111. A rotational speed of the speed increasing ring gear 115 is increased higher than a rotational speed of the speed increasing carrier 114.

Specifically, when the speed increasing carrier 114 is rotated by the torque delivered from the input member 102, the speed increasing sun gear 113 serves as a reaction element of the speed increasing gear set 108 so that a rotational speed of the speed increasing ring gear 115 is increased higher than a rotational speed of the speed increasing carrier 114. Thus, the speed increasing gear set 108 serves as a speed increasing mechanism.

As indicated in FIG. 4, the number of teeth of the reduction sun gear 109 is 36, the number of teeth of the reduction ring gear 111 is 72, and the number of teeth of each of the planetary gears 112 is 18. Accordingly, a speed reducing ratio of the speed reducing gear set 107 is approximately 3. Therefore, as indicated in FIG. 4, an actual speed reducing ratio R' of the reversing mechanism 7 between the actuator 6 and the first rotary shaft 4 or the second rotary shaft 5 taking into account the speed reducing ratio of the speed reducing gear set 107 is:

$$R' = \pm 18 \cdot 3 = \pm 54.$$

Thus, in the torque vectoring device 1 according to the fourth example, the speed reducing gear set 107 and the speed increasing gear set 108 are arranged in parallel to each other along the rotational center axis AL across the second plate 106 of the carrier 101. According to the fourth example, therefore, the speed reducing gear set 107 the second plate 106, and the speed increasing gear set 108 may be situated only on one side of the planetary gear shafts 33 while being adjacent to one another. For this reason, a structure of the torque vectoring device 1 according to the fourth example can be simplified compared e.g., to the torque vectoring device 1 according to the third example.

Fifth Example

Figure 5:
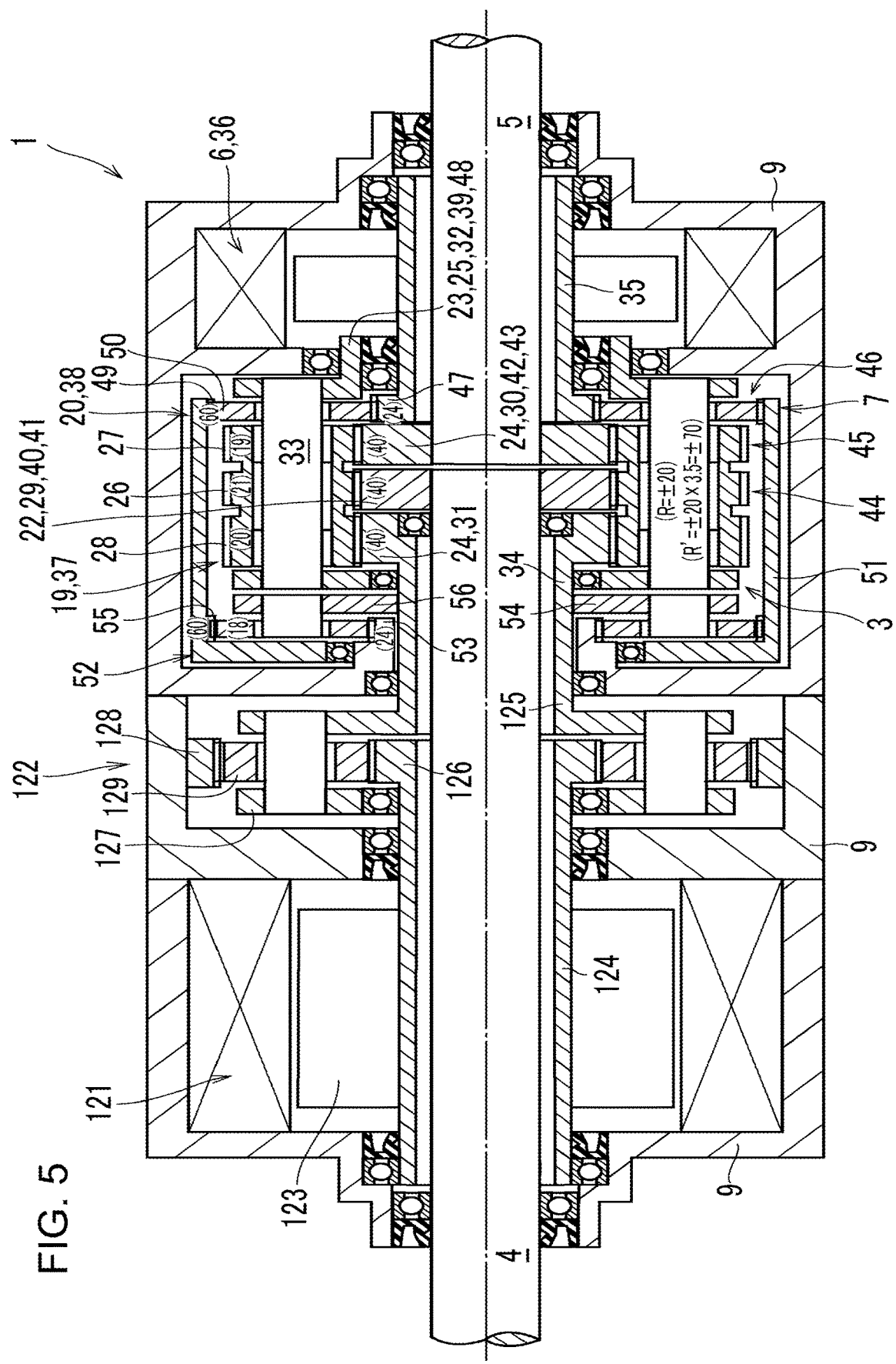
FIG. 5 is a cross-sectional view showing a structure of the torque vectoring device according to the fifth example of the present disclosure.

Turning to FIG. 5, there is shown the fifth example of the torque vectoring device 1 according to the present disclosure. According to the fifth example, the torque vectoring device 1 is designed as a so-called "center differential device" to be mounted on four-wheel drive layout vehicles. To this end, in the torque vectoring device 1 shown in FIG. 5, the first rotary shaft 4 and the second rotary shaft 5 extend coaxially in the longitudinal direction of the vehicle (i.e., along the rotational center axis AL shown in FIG. 5).

According to the fifth example, the torque vectoring device 1 is provided with an electric motor 121 as a geared motor connected in tandem to a reduction gear mechanism 122. Specifically, the electric motor 121 is arranged coaxially with the first rotary shaft 4 and the second rotary shaft 5, and generates a torque to rotate the first rotary shaft 4 and the second rotary shaft 5. The reduction gear mechanism 122 is interposed between the electric motor 121 and the differential mechanism 3.

For example, a permanent magnet type synchronous motor or an induction motor may be adopted as the electric motor 121. Specifically, the electric motor 121 comprises a hollow rotor 123, and a hollow rotor shaft 124 supporting the rotor 123 in a rotatable manner. The rotor shaft 124 is supported by the case 9 in a rotatable manner, and the first rotary shaft 4 penetrates through first rotary shaft 4 while being allowed to rotate relatively to the rotor shaft 124.

The reduction gear mechanism 122 transmits an output torque of the electric motor 121 to an input member 125 of the torque vectoring device 1 while multiplying. According to the fifth example, the input member 125 as a hollow rotary shaft is fitted onto the first rotary shaft 4 while being supported by the case 9 in a rotatable manner so that the input member 125 rotates relatively to the first rotary shaft 4. One end (i.e., the right end in FIG. 5) of the input member 125 is connected to the third sun gear shaft 34 of the differential mechanism 3 so that the input member 125 is rotated integrally with the third sun gear shaft 34. The reduction gear mechanism 122 is a single-pinion planetary gear set comprising a sun gear 126, a carrier 127, a ring gear 128, and a set of planetary gears 129.

In the reduction gear mechanism 122, the sun gear 126 is formed around a leading end of the rotor shaft 124 of the electric motor 121 to be rotated integrally with the rotor shaft 124. The carrier 127 supporting the planetary gears 129 in a rotatable manner is connected to the input member 125 to be rotated integrally with the input member 125 and the third sun gear shaft 34. The ring gear 128 as an internal gear is fixed to an inner surface of the case 9 while being meshed with the planetary gears 129.

When the torque of the electric motor 121 is delivered to the sun gear 126, the ring gear 128 serves as a reaction element of the reduction gear mechanism 122 so that a rotational speed of the carrier 127 is reduced lower than a rotational speed of the reduction sun gear 126. That is, the reduction gear mechanism 122 transmits the output torque of the electric motor 121 to the input member 125 while multiplying.

Thus, according to the fifth example, the torque vectoring device 1 is designed to be a compact power unit in which the geared electric motor 121 is arranged coaxially. Here, in the torque vectoring device 1 according to the fifth example, a motor 36 is employed as the actuator 6. For example, the torque vectoring device 1 shown in FIG. 5 may be mounted on a four-wheel drive layout vehicle to serve as a center differential device having a torque vectoring function.

Figure 6:
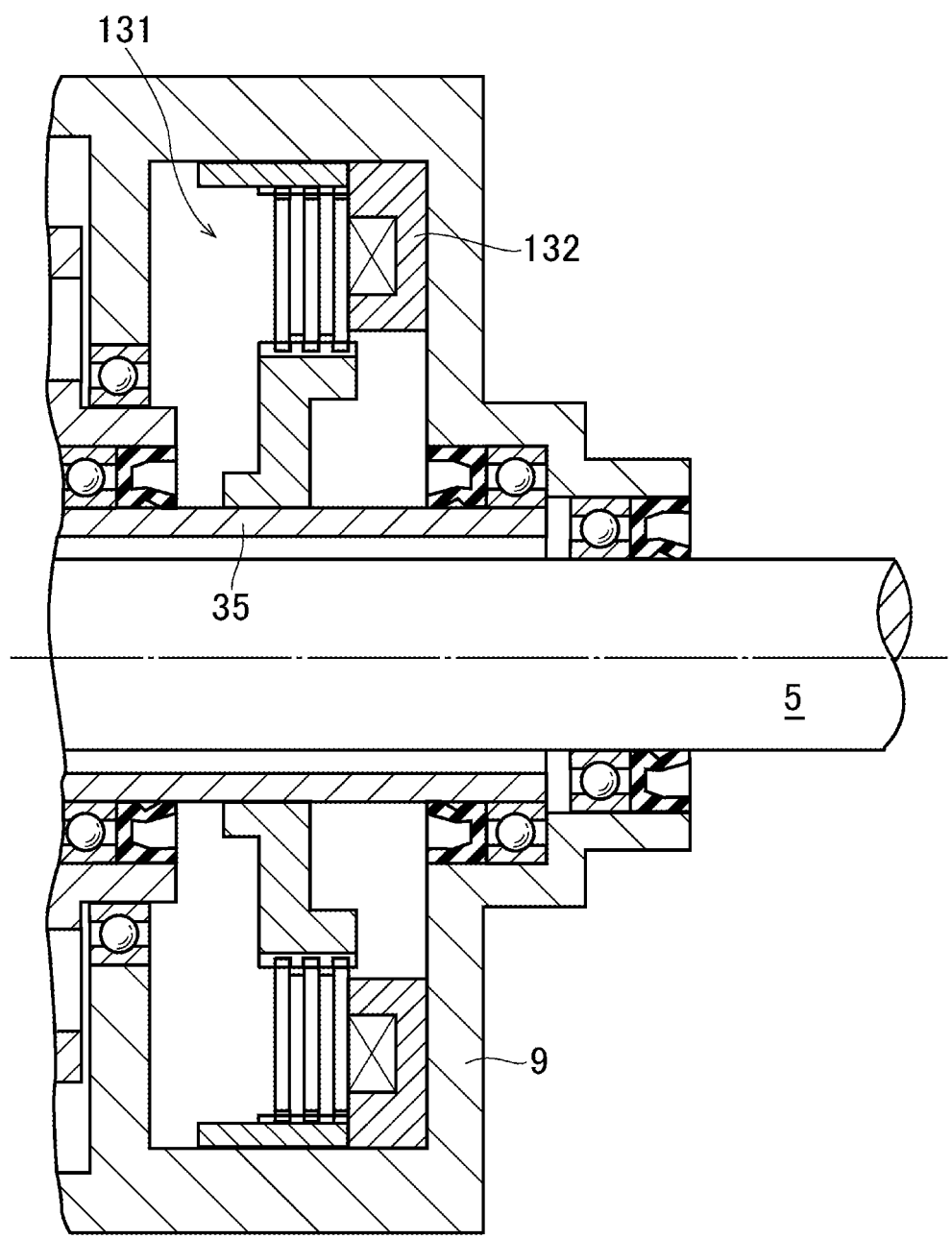
FIG. 6 is a cross-sectional view showing a structure of an electromagnetic brake serving as the actuator.
Figure 7:
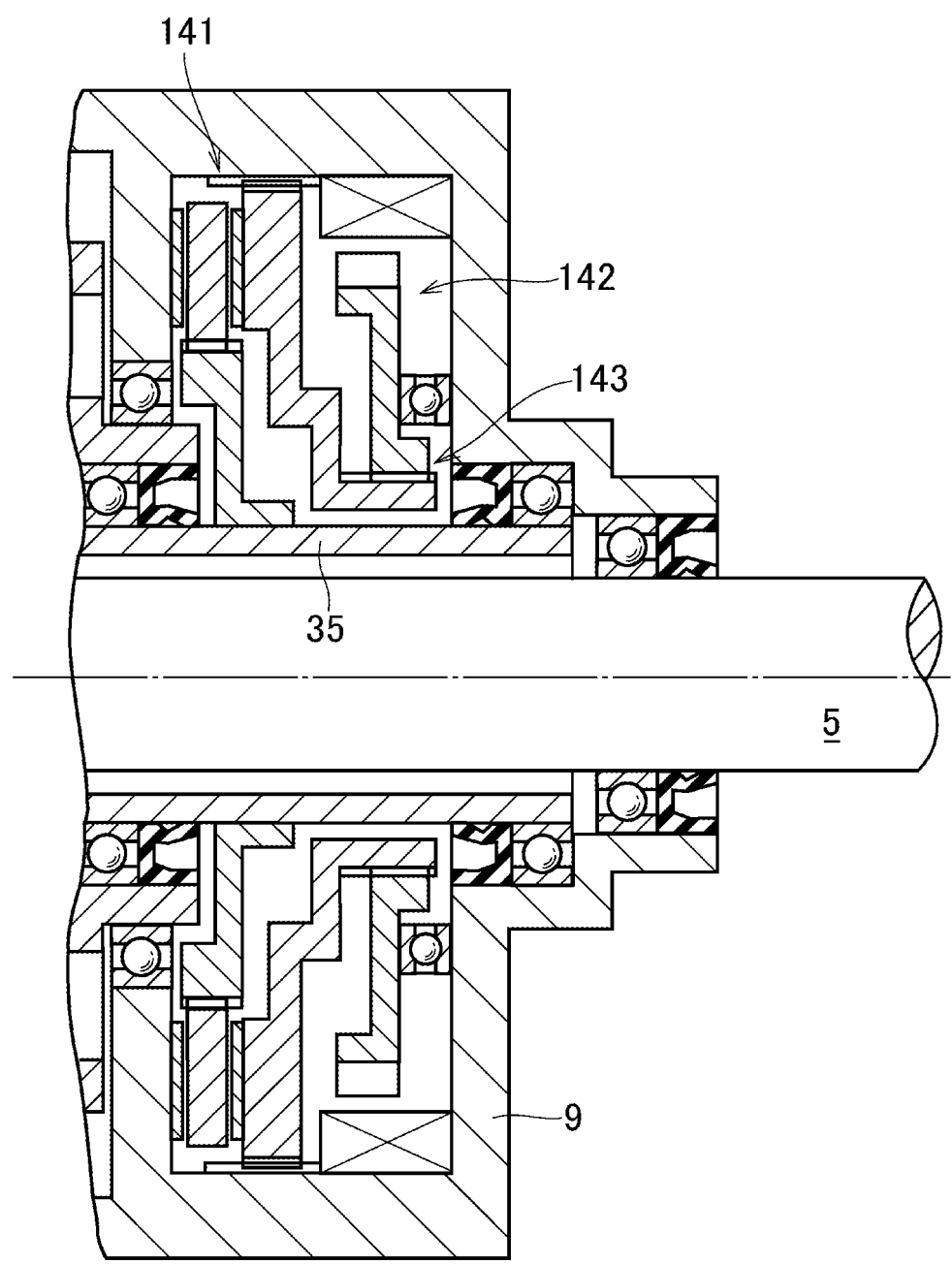
FIG. 7 is a cross-sectional view showing a structure of an electric brake serving as the actuator.

Although the above exemplary embodiment of the present disclosure has been described, it will be understood by those skilled in the art that the present disclosure should not be limited to the described exemplary embodiments, and various changes and modifications can be made within the scope of the present disclosure. As described, a brake device may also be adopted as the actuator 6 to generate torque for controlling the first differential reaction element 23 and the second differential reaction element 25. For example, an electromagnetic brake 131 shown in FIG. 6 may also be employed as the actuator 6. Specifically, the electromagnetic brake 131 is adapted to apply a braking force derived from a magnetic attraction established by energizing a coil 132 to the first differential reaction element 23 and the second differential reaction element 25. In addition, an electric brake 141 shown in FIG. 7 may also be employed as the actuator 6. Specifically, the electric brake 141 is adapted to generate a frictional braking force by actuating a feed-screw mechanism 143 by a motor 142.

What is claimed is:

1. A torque vectoring device, comprising:
an input member to which a torque is delivered from a prime mover;
a first rotary shaft and a second rotary shaft extending coaxially while being allowed to rotate relatively to each other;
a differential mechanism that distributes the torque delivered to the input member to the first rotary shaft and the second rotary shaft, and that allows the first rotary shaft and the second rotary shaft to rotate at different speeds;
an actuator that applies a control torque to the differential mechanism to rotate the first rotary shaft and the second rotary shaft at different speeds; and
a reversing mechanism that allows the first rotary shaft and the second rotary shaft to rotate in opposite directions when the first rotary shaft and the second rotary shaft rotate at different speeds,
wherein the differential mechanism comprises a first power transmission gear set and a second power transmission gear set arranged coaxially with the first rotary shaft and the second rotary shaft,
the first power transmission gear set comprises:
a power input element to which the torque is delivered from the input member;
a first power output element which delivers the torque to the first rotary shaft; and
a first differential reaction element to which the control torque is applied as a reaction force against the torque delivered from the power input element to the first power output element,
the second power transmission gear set comprises:
the power input element;
a second power output element which delivers the torque to the second rotary shaft; and
a second differential reaction element to which the control torque is applied as a reaction force against the torque delivered from the power input element to the second power output element,
the reversing mechanism comprises:
a first control gear set that is arranged coaxially around the first rotary shaft and the second rotary shaft to transmit the control torque to the first rotary shaft through the first differential reaction element; and
a second control gear set that is arranged coaxially around the first rotary shaft and the second rotary shaft to transmit the control torque to the second rotary shaft through the second differential reaction element,
the first control gear set comprises:
a control input element to which the control torque of the actuator is applied;
a first control output element which delivers the control torque to the first rotary shaft;
a first planetary gear to which the control torque is delivered from the control input element; and
a first gear that engages with the first planetary gear to serve as the first control output element,
the second control gear set comprises:
the control input element;
a second control output element which delivers the control torque to the second rotary shaft;
a second planetary gear which is arranged coaxially with the first planetary gear, and to which the control torque is delivered from the control input element; and
a second gear that engages with the second planetary gear to serve as the second control output element,
a first gear train includes the first planetary gear and the first gear,
a second gear train includes the second planetary gear and the second gear,
a gear ratio of the first gear train and a gear ratio of the second gear train are different from each other,
a first speed reducing ratio of the reversing mechanism as a ratio of a speed of the first control output element to a speed of the control input element is greater than 1,
a second speed reducing ratio of the reversing mechanism as a ratio of a speed of the second control output element to the speed of the control input element is greater than 1,
the reversing mechanism serves as a reduction gear mechanism to transmit the control torque to the first control output element and the second control output element while multiplying the control torque,
the torque vectoring device further comprising:
a speed increasing gear set comprising a speed increasing sun gear, a speed increasing carrier, and a speed increasing ring gear, that is arranged coaxially with the first rotary shaft and the second rotary shaft; and
a speed reducing gear set comprising a reduction sun gear, a reduction carrier, and a reduction ring gear, that is arranged coaxially with the first rotary shaft and the second rotary shaft,
the speed increasing sun gear is fixed and not allowed to rotate,
the speed increasing carrier is connected to the input member to be rotated integrally with the input member,
the speed increasing ring gear is rotated at a higher speed than a speed of the speed increasing carrier,
the reduction sun gear is connected to an output shaft of the actuator transmitting the control torque to the reversing mechanism to be rotated integrally with the output shaft,
the reduction carrier is rotated at a lower speed than a speed of the reduction ring gear when the input member, the first rotary shaft, and the second rotary shaft are rotated integrally, and
the reduction ring gear is connected to the speed increasing ring gear to be rotated integrally with the speed increasing ring gear.

2. The torque vectoring device according to claim 1, wherein the reduction sun gear is rotated relatively to the reversing mechanism, when the first rotary shaft and the second rotary shaft rotate in a same direction at a same speed so that the reversing mechanism is rotated passively together with the power input element, the first power output element, and the second power output element.

3. The torque vectoring device according to claim 1, wherein a gear ratio of the speed increasing gear set and a gear ratio of the speed reducing gear set are equal to each other.

4. The torque vectoring device according to claim 1, further comprising:
a third planetary gear arranged coaxially with the first planetary gear and the second planetary gear; and
a carrier, that serves as the reduction carrier, the carrier supports the first planetary gear, the second planetary gear, and the third planetary gear in a rotatable and revolvable manner,
wherein the first planetary gear, the second planetary gear, and the third planetary gear rotate integrally, the torque is delivered from the power input element to the third planetary gear, the differential mechanism comprises:
- the first planetary gear, the second planetary gear, and the third planetary gear;
- a first sun gear, a second sun gear, and a third sun gear arranged coaxially with one another while engaging with the first planetary gear, the second planetary gear, and the third planetary gear, respectively; and
- the carrier, the first sun gear, the second sun gear, and the third sun gear are allowed to rotate relatively to one another, the first power transmission gear set comprises:
- the third sun gear serving as the power input element;
- the first sun gear serving as the first power output element; and
- the carrier serving as the first differential reaction element, the second power transmission gear set comprises:
- the third sun gear serving as the power input element;
- the second sun gear serving as the second power output element; and
- the carrier serving as the second differential reaction element, the reversing mechanism comprises:
- the first planetary gear, the second planetary gear, and the third planetary gear;
- the first sun gear, the second sun gear, and the third sun gear; and
- the carrier, the first control gear set comprises:
- the carrier serving as the control input element; and
- the first sun gear serving as the first gear to serve as the first control output element, the second control gear set comprises:
- the carrier serving as the control input element; and
- the second sun gear serving as the second gear to serve as the second control output element, a number of teeth of the first sun gear, a number of teeth of the second sun gear, and a number of teeth of the third sun gear are equal to one another, a number of teeth of the first planetary gear is larger than a number of teeth of the third planetary gear, and a number of teeth of the second planetary gear is smaller than the number of teeth of the third planetary gear.

5. The torque vectoring device according to claim 1, further comprising:
- a third planetary gear arranged coaxially with the first planetary gear and the second planetary gear; and
- a carrier that supports the first planetary gear, the second planetary gear, and the third planetary gear in a rotatable and revolvable manner, wherein the first planetary gear, the second planetary gear, and the third planetary gear rotate integrally, the torque is delivered from the power input element to the third planetary gear, the differential mechanism comprises:
- the first planetary gear, the second planetary gear, and the third planetary gear;
- a first ring gear as an internal gear, a second ring gear as an internal gear, and a third ring gear as an internal gear arranged coaxially with one another while engaging with the first planetary gear, the second planetary gear, and the third planetary gear, respectively; and
- the carrier, the first ring gear, the second ring gear, and the third ring gear are allowed to rotate relatively to one another, the first power transmission gear set comprises:
- the third ring gear serving as the power input element;
- the first ring gear serving as the first power output element; and
- the carrier serving as the first differential reaction element, the second power transmission gear set comprises:
- the third ring gear serving as the power input element;
- the second ring gear serving as the second power output element; and
- the carrier serving as the second differential reaction element, the reversing mechanism comprises:
- the first planetary gear, the second planetary gear, and the third planetary gear;
- the first ring gear, the second ring gear, and the third ring gear; and
- the carrier, the first control gear set comprises:
- the carrier serving as the control input element; and
- the first ring gear serving as the first gear to serve as the first control output element, the second control gear set comprises:
- the carrier serving as the control input element; and
- the second ring gear serving as the second gear to serve as the second control output element, a number of teeth of the first ring gear, a number of teeth of the second ring gear, and a number of teeth of the third ring gear are equal to one another, a number of teeth of the first planetary gear is larger than a number of teeth of the third planetary gear, and a number of teeth of the second planetary gear is smaller than the number of teeth of the third planetary gear.

6. The torque vectoring device according to claim 5, wherein the carrier comprises
- a planetary gear shaft that supports the first planetary gear, the second planetary gear, and the third planetary gear in a rotatable manner,
- a first plate that supports one end of the planetary gear shaft, and
- a second plate that supports the other end of the planetary gear shaft, and the speed increasing gear set and the speed reducing gear set are arranged parallel to each other across the first plate or the second plate along a rotational center axis.

7. The torque vectoring device according to claim 1, wherein the first rotary shaft and the second rotary shaft extend coaxially in a width direction of a vehicle.

8. The torque vectoring device according to claim 1, wherein the first rotary shaft and the second rotary shaft extend coaxially in a longitudinal direction of a vehicle.

* * * * *